United States Patent
Zhevelev et al.

(10) Patent No.: US 9,280,891 B2
(45) Date of Patent: Mar. 8, 2016

(54) AUTOMATIC INTRUSION DETECTOR THRESHOLD CONTROLLING SYSTEMS AND METHODS

(71) Applicant: Tyco Fire & Security GmbH, Neuhausen am Rheinfall (CH)

(72) Inventors: Boris Zhevelev, Rishon-Le-Zion (IL); Eli Litvak, Netanya (IL); Yehuda Shviki, Rishon-Le-Zion (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 119 days.

(21) Appl. No.: 14/109,974

(22) Filed: Dec. 18, 2013

(65) Prior Publication Data
US 2014/0167952 A1    Jun. 19, 2014

Related U.S. Application Data

(60) Provisional application No. 61/739,213, filed on Dec. 19, 2012.

(51) Int. Cl.
*G08B 23/00*     (2006.01)
*G08B 29/26*     (2006.01)
(Continued)

(52) U.S. Cl.
CPC .............. *G08B 29/26* (2013.01); *G06F 21/552* (2013.01); *H04L 63/1408* (2013.01); *H04L 63/1416* (2013.01); *G08B 27/003* (2013.01); *G08B 29/188* (2013.01)

(58) Field of Classification Search
CPC ............ H04L 63/1416; H04L 63/1408; G08B 13/1654; G06F 21/552
USPC .............................. 340/506, 522, 541; 726/23
See application file for complete search history.

(56) References Cited

U.S. PATENT DOCUMENTS

| 5,243,322 A | 9/1993 | Thompson et al. |
| 2006/0028334 A1 | 2/2006 | Adonailo et al. |

(Continued)

FOREIGN PATENT DOCUMENTS

| GB | 2 223 583 A | 4/1990 |
| GB | 2 295 230 A | 5/1996 |
| WO | 2012/089215 A2 | 7/2012 |

OTHER PUBLICATIONS

Combined Search and Examination Report, mailed Oct. 24, 2014, from related GB Application GB1416499.0.

(Continued)

*Primary Examiner* — John A Tweel, Jr.
(74) *Attorney, Agent, or Firm* — HoustonHogle, LLP

(57) ABSTRACT

A system for automatically controlling intrusion thresholds of intrusion detectors deployed in a premises, the system including intrusion detector output receiving functionality operative to receive at least one output from at least a first intrusion detector deployed in the premises, intrusion detector output comparison functionality operative to compare the at least one output from the at least a first intrusion detector with at least one of a multiplicity of premises intrusion detection patterns, and intrusion detector threshold controlling functionality operative, in response to ascertaining that the at least one output from the at least a first intrusion detector matches at least one of the multiplicity of premises intrusion detection patterns, to automatically tune a threshold of at least a second intrusion detector deployed in the premises.

63 Claims, 12 Drawing Sheets

(51) Int. Cl.
  *H04L 29/06* (2006.01)
  *G06F 21/55* (2013.01)
  *G08B 27/00* (2006.01)
  *G08B 29/18* (2006.01)

(56) References Cited

U.S. PATENT DOCUMENTS

2007/0192860 A1* 8/2007 Hiscock ............... 726/23
2015/0033340 A1* 1/2015 Giokas ............... 726/23

OTHER PUBLICATIONS

Combined Search and Examination Report, mailed Oct. 24, 2014, from related GB Application GB1416498.2.

834L Viper Plus, Frame Mount Glassbreak/Selective Vibration Detector, Installation Instructions by International Electronics, Inc, May 2014.
ShockTec Plus Grade 3, Installation Instructions by Risco Group, May 2014.
EV-DW4927 Dual Function Shock/Reed Sensor, 2006 Secure Wireless.
Impaq Plus-W Installation Instructions (Impaq and the wireless logo are trade marks of Texecom Ltd. © 2010).
Sentrol 5400 Series, Glassbreak Shock Sensors Models 5414, 5415A, 5425, Installation Instructions, 1999.
Spyder—Shock Sensor ,Detection Devices from Elmdene Security & FireProducts, http://www.elmdene.co.uk/products/detection.htm, 2009.

* cited by examiner

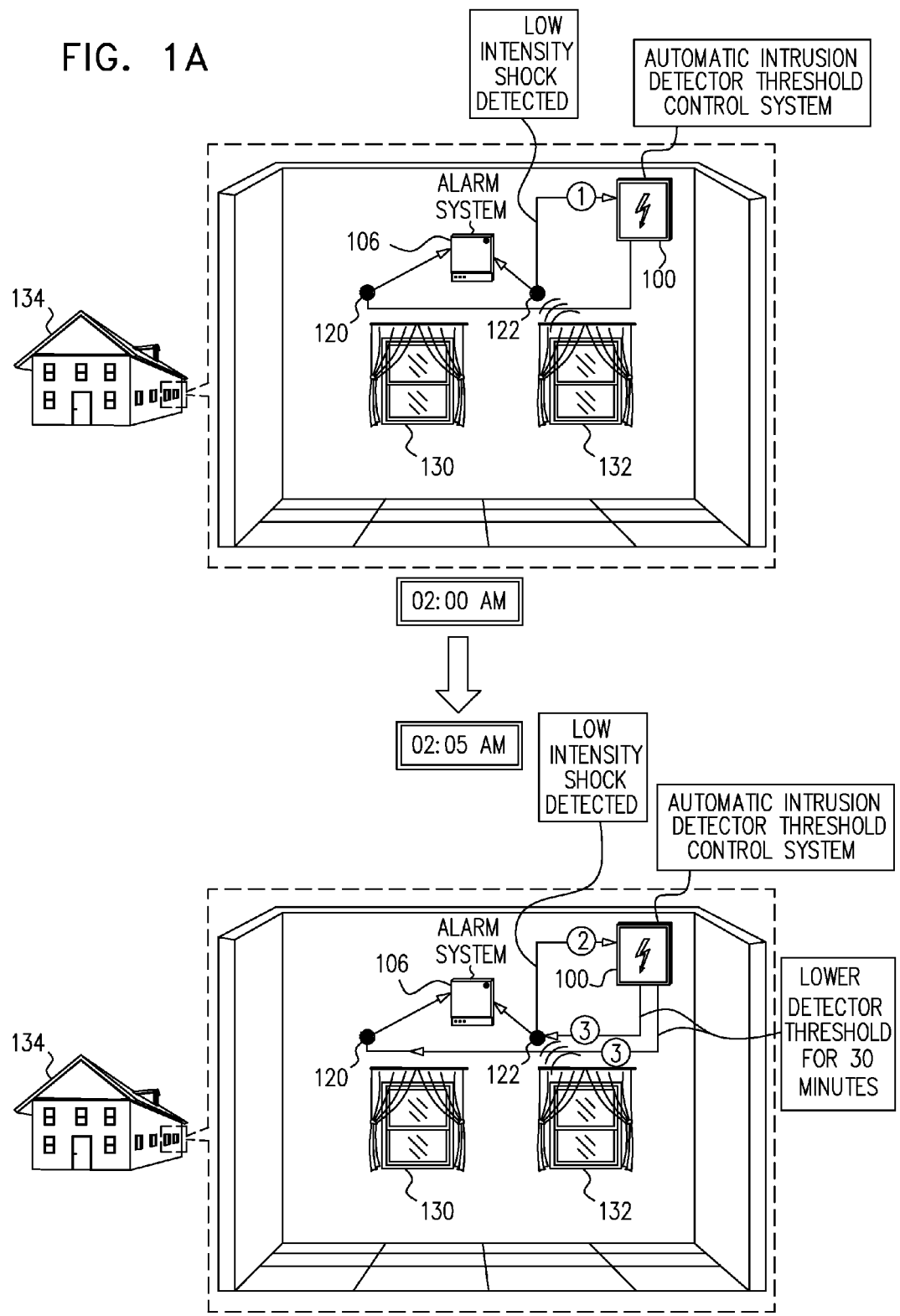

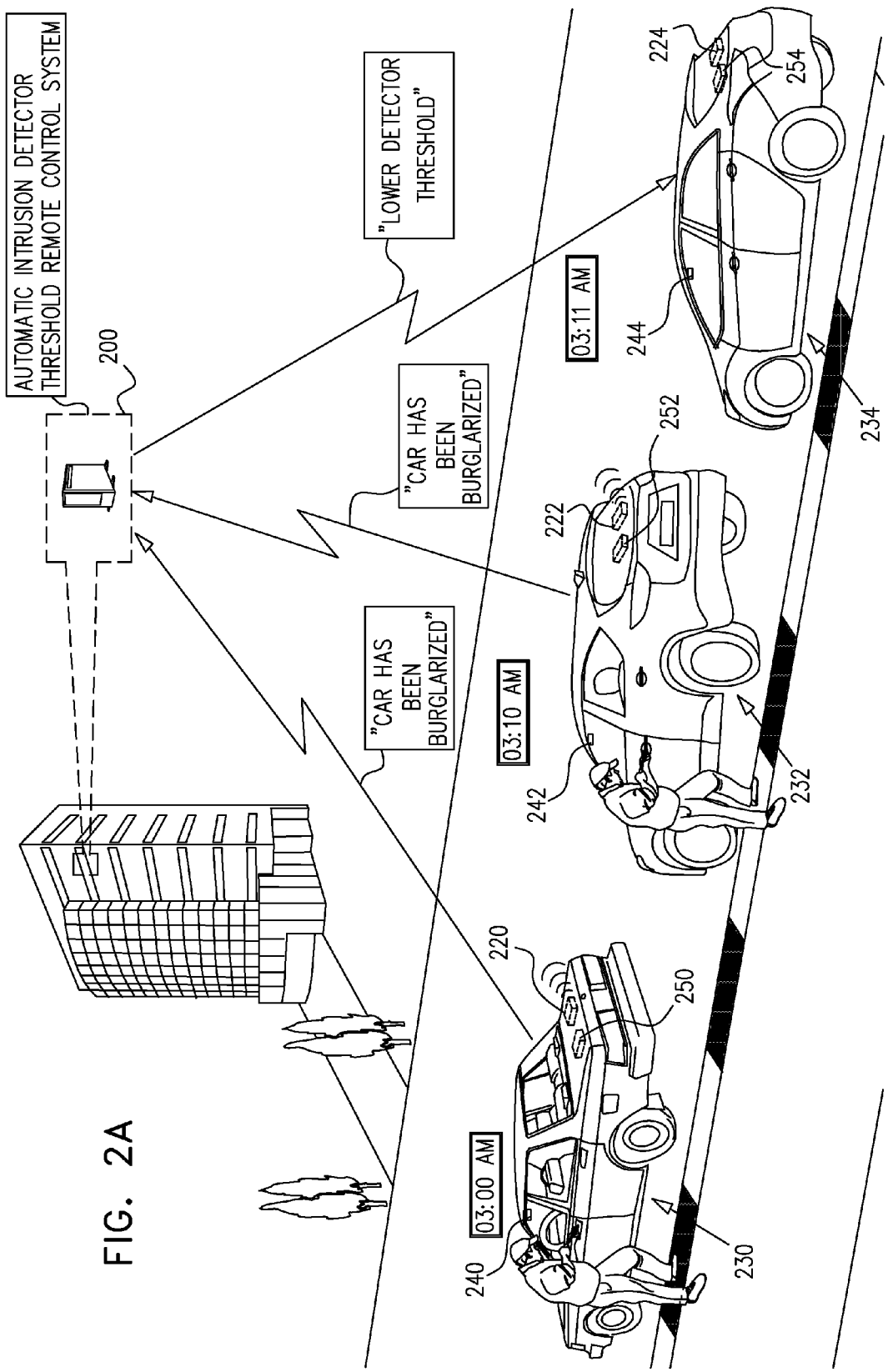

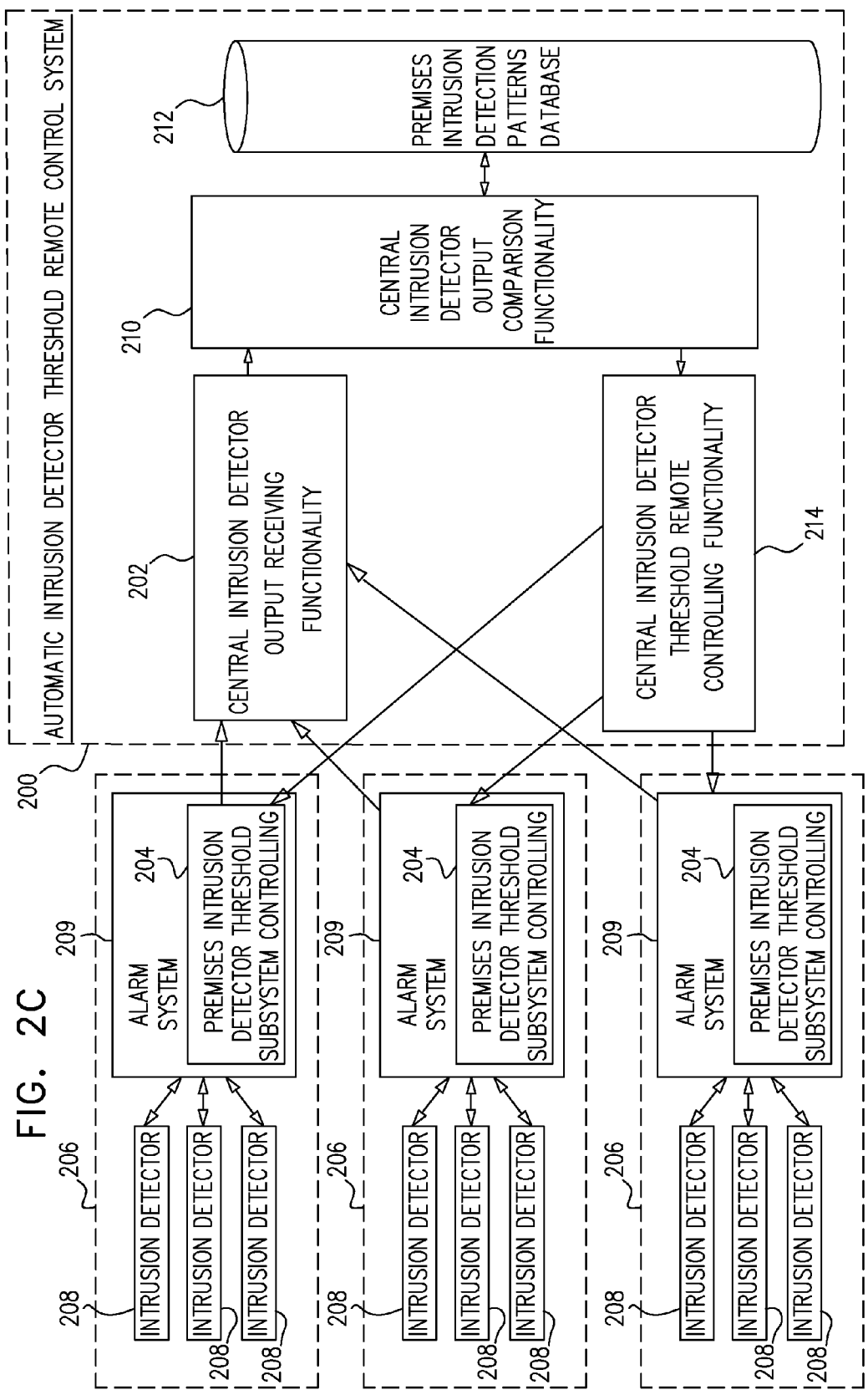

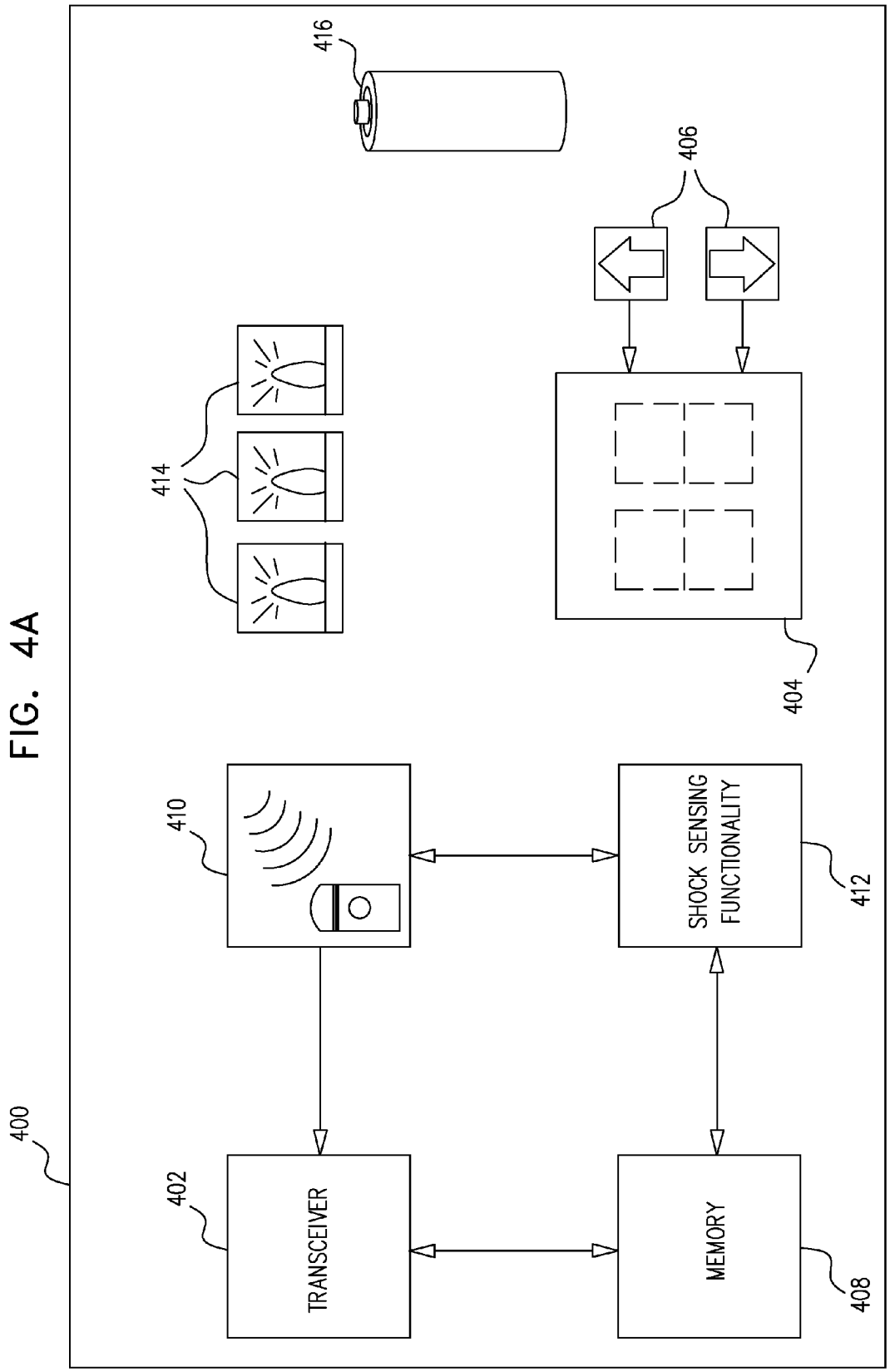

AUTOMATIC INTRUSION DETECTOR THRESHOLD CONTROLLING SYSTEMS AND METHODS

REFERENCE TO RELATED APPLICATIONS

Reference is made to U.S. Provisional Patent Application Ser. No. 61/739,213 filed Dec. 19, 2012 and entitled "VIBRATION/SHOCK SENSOR AND METHODS OF ADJUSTMENT THEREOF", the disclosure of which is hereby incorporated by reference and priority of which is hereby claimed pursuant to 37 CFR 1.78(a) (4) and (5)(i).

FIELD OF THE INVENTION

The present invention relates to systems and methods for automatically controlling intrusion thresholds of intrusion detectors typically employed in intrusion detections systems.

BACKGROUND OF THE INVENTION

Intrusion detectors employed as part of intrusion detection systems typically have a sensitivity and an intrusion threshold associated therewith. Typically, a sensitivity of a detector defines a minimum intensity of a physical event which the detector is capable of detecting. An intrusion threshold of a detector is a configurable level of intensity of a physical event which is considered as indicative of an intrusion. The present invention relates to novel systems and methods for automatically controlling intrusion detector thresholds.

SUMMARY OF THE INVENTION

The present invention seeks to provide systems and methods for automatically controlling intrusion thresholds of intrusion detectors typically employed in intrusion detections systems.

There is thus provided in accordance with a preferred embodiment of the present invention a system for automatically controlling intrusion thresholds of intrusion detectors deployed in a premises, the system including intrusion detector output receiving functionality operative to receive at least one output from at least a first intrusion detector deployed in the premises, intrusion detector output comparison functionality operative to compare the at least one output from the at least a first intrusion detector with at least one of a multiplicity of premises intrusion detection patterns, and intrusion detector threshold controlling functionality operative, in response to ascertaining that the at least one output from the at least a first intrusion detector matches at least one of the multiplicity of premises intrusion detection patterns, to automatically tune a threshold of at least a second intrusion detector deployed in the premises.

Preferably, the at least one of the multiplicity of premises intrusion detection patterns includes at least a pattern of at least one shock wave detected at each of at least two intrusion detectors.

Preferably, the premises is an automobile. Additionally or alternatively, the premises is a residence. Preferably, the intrusion detectors include at least one motion detector. Additionally or alternatively, the intrusion detectors include at least one shock detector. Additionally or alternatively, the intrusion detectors include at least one environmental conditions detector.

Preferably, the intrusion detectors communicate with an intrusion alarm system. Preferably, the system for automatically controlling intrusion thresholds of intrusion detectors deployed in a premises is located in the intrusion alarm system.

Preferably, automatically tuning the threshold of the at least a second intrusion detector deployed in the premises includes lowering the threshold. Additionally or alternatively, automatically tuning the threshold of the at least a second intrusion detector deployed in the premises includes raising the threshold.

There is also provided in accordance with another preferred embodiment of the present invention a system for automatically remotely controlling intrusion thresholds of intrusion detectors deployed in a plurality of premises, the system including central intrusion detector output receiving functionality operative to receive at least one output from at least one intrusion detector deployed in a first of the plurality of premises, central intrusion detector output comparison functionality operative to compare the at least one output from the at least one intrusion detector deployed in the first of the plurality of premises with a multiplicity of premises intrusion detection patterns, and central intrusion detector threshold remote controlling functionality operative, in response to ascertaining, by the central intrusion detector threshold remote controlling functionality, that the at least one output from the at least one intrusion detector deployed in the first of the plurality of premises matches at least one of the multiplicity of premises intrusion detection patterns, to automatically remotely tune a threshold of at least one intrusion detector deployed in at least a second of the plurality of premises.

Preferably, the central intrusion detector output receiving functionality is operative to receive the at least one output from the at least one intrusion detector deployed in the first of the plurality of premises via a premises intrusion detector threshold controlling subsystem deployed at the first of the plurality of premises. Additionally, the central intrusion detector threshold remote controlling functionality operative to automatically remotely tune the threshold of the at least one intrusion detector deployed in the at least a second of the plurality of premises via a premises intrusion detector threshold controlling subsystem deployed at the second of the plurality of premises.

Preferably, the multiplicity of premises intrusion detection patterns includes at least a pattern of at least one shock wave detected at each of at least two premises.

Preferably, the plurality of premises includes at least one automobile. Additionally or alternatively, the plurality of premises includes at least one residence. Preferably, the intrusion detectors include at least one motion detector. Additionally or alternatively, the intrusion detectors include at least one shock detector. Additionally or alternatively, the intrusion detectors include at least one environmental conditions detector.

Preferably, automatically remotely tuning the threshold of the at least one intrusion detector deployed in the at least a second of the plurality of premises includes lowering the threshold. Additionally or alternatively, automatically remotely tuning the threshold of the at least one intrusion detector deployed in the at least a second of the plurality of premises includes raising the threshold.

There is further provided in accordance with yet another preferred embodiment of the present invention a system for automatically remotely controlling intrusion thresholds of intrusion detectors deployed in a plurality of premises, the system including environmental information receiving functionality operative to receive environmental information pertaining to the environment of at least some of the plurality of premises, environmental information comparison functionality operative to compare the environmental information received from the environmental information receiving functionality with a multiplicity of environmental patterns, and central intrusion detector threshold remote controlling functionality operative, in response to ascertaining that the environmental information received from the environmental information receiving functionality matches at least one of the multiplicity of environmental patterns, to automatically remotely tune a threshold of at least one intrusion detector deployed in at least one of the some of the plurality of premises.

Preferably, the central intrusion detector output receiving functionality is operative to receive the at least one output from the at least one intrusion detector deployed in the first of the plurality of premises via a premises intrusion detector threshold controlling subsystem deployed at the first of the plurality of premises. Additionally, the central intrusion detector threshold remote controlling functionality operative to automatically remotely tune the threshold of the at least one intrusion detector deployed in the at least a second of the plurality of premises via a premises intrusion detector threshold controlling subsystem deployed at the second of the plurality of premises.

Preferably, the environmental information and the environmental patterns pertain to weather conditions at the at least some of the plurality of premises. Additionally or alternatively, the environmental information pertains to recent intrusions detected at the at least some of the plurality of premises.

Preferably, the plurality of premises includes at least one automobile. Additionally or alternatively, the plurality of premises includes at least one residence.

Preferably, the intrusion detectors include at least one motion detector. Additionally or alternatively, the intrusion detectors include at least one shock detector. Additionally or alternatively, the intrusion detectors include at least one environmental conditions detector.

Preferably, automatically remotely tuning the threshold of the at least one intrusion detector deployed in the at least a second of the plurality of premises includes lowering the threshold. Additionally or alternatively, automatically remotely tuning the threshold of the at least one intrusion detector deployed in the at least a second of the plurality of premises includes raising the threshold.

There is yet further provided in accordance with still another preferred embodiment of the present invention a tunable intrusion shock detector including at least one sensor having a tunable intrusion threshold, and discrete intrusion threshold tuning functionality having a plurality of discrete precalibrated threshold levels operable for discrete tuning of an intrusion threshold of the intrusion detector to one of the discrete precalibrated threshold levels.

Preferably, the tunable intrusion shock detector also includes discrete intrusion threshold input functionality communicating with the discrete intrusion threshold tuning functionality, operable for manually tuning the intrusion threshold of the intrusion detector to one of the discrete precalibrated threshold levels. Preferably, the discrete intrusion threshold tuning functionality includes an alpha-numeric display operative to display the intrusion threshold of the intrusion detector. Preferably, the discrete intrusion threshold input functionality includes at least one push button.

Preferably, the discrete tuning of the intrusion threshold of the intrusion detector includes tuning the intrusion threshold to a discrete numeric value. Preferably, the tunable intrusion shock detector also includes a memory operative to store the discrete numeric value.

Preferably, the tunable intrusion shock detector also includes a transceiver operable for at least one of transmitting and receiving the intrusion threshold. Preferably, the transceiver is operable for at least one of transmitting and receiving the intrusion threshold between the tunable intrusion detector and at least one of a system for automatically controlling intrusion thresholds of intrusion detectors deployed in a premises and a system for automatically remotely controlling intrusion thresholds of intrusion detectors deployed in a plurality of premises.

Preferably, the tunable intrusion shock detector also includes a microphone for detection of at least one acoustic event which may be indicative of an intrusion.

Preferably, the tunable intrusion shock detector also includes shock sensing functionality operative to sense shock waves and to employ the intrusion threshold stored in the memory to ascertain whether a combination of the sensed shock waves and the at least one acoustic event received by the microphone is indicative of an intrusion. Preferably, upon ascertaining that the combination of the sensed shock waves and the at least one acoustic event received by the microphone is indicative of an intrusion, the intrusion detector is operative to transmit an indication of the intrusion to an alarm system communicating therewith.

There is yet further provided in accordance with still another preferred embodiment of the present invention a method for automatically controlling intrusion thresholds of intrusion detectors deployed in a premises, the method including receiving at least one output from at least a first intrusion detector deployed in the premises, comparing the at least one output from the at least a first intrusion detector with at least one of a multiplicity of premises intrusion detection patterns, and in response to ascertaining that the at least one output from the at least a first intrusion detector matches at least one of the multiplicity of premises intrusion detection patterns, tuning a threshold of at least a second intrusion detector deployed in the premises.

Preferably, the at least one of the multiplicity of premises intrusion detection patterns includes at least a pattern of at least one shock wave detected at each of at least two intrusion detectors.

Preferably, the premises is an automobile. Additionally or alternatively, the premises is a residence.

Preferably, the intrusion detectors include at least one motion detector. Additionally or alternatively, the intrusion detectors include at least one shock detector. Additionally or alternatively, the intrusion detectors include at least one environmental conditions detector.

Preferably, the intrusion detectors communicate with an intrusion alarm system.

Preferably, automatically tuning the threshold of the at least a second intrusion detector deployed in the premises includes lowering the threshold. Additionally or alternatively, automatically tuning the threshold of the at least a second intrusion detector deployed in the premises includes raising the threshold.

There is also provided in accordance with another preferred embodiment of the present invention a method for automatically remotely controlling intrusion thresholds of intrusion detectors deployed in a plurality of premises, the method including receiving at least one output from at least one intrusion detector deployed in a first of the plurality of premises, comparing the at least one output from the at least one intrusion detector deployed in the first of the plurality of premises with a multiplicity of premises intrusion detection patterns, and in response to ascertaining that the at least one output from the at least one intrusion detector deployed in the first of the plurality of premises matches at least one of the multiplicity of premises intrusion detection patterns, automatically remotely tuning a threshold of at least one intrusion detector deployed in at least a second of the plurality of premises.

Preferably, the multiplicity of premises intrusion detection patterns includes at least a pattern of at least one shock wave detected at each of at least two premises.

Preferably the plurality of premises includes at least one automobile. Additionally or alternatively, the plurality of premises includes at least one residence.

Preferably, the intrusion detectors include at least one motion detector. Additionally or alternatively, the intrusion detectors include at least one shock detector. Additionally or alternatively, the intrusion detectors include at least one environmental conditions detector.

Preferably, automatically remotely tuning the threshold of the at least one intrusion detector deployed in the at least a second of the plurality of premises includes lowering the threshold. Additionally or alternatively, automatically remotely tuning the threshold of the at least one intrusion detector deployed in the at least a second of the plurality of premises includes raising the threshold.

There is further provided in accordance with yet another preferred embodiment of the present invention a method for automatically remotely controlling intrusion thresholds of intrusion detectors deployed in a plurality of premises, the method including receiving environmental information pertaining to the environment of at least some of the plurality of premises, comparing the environmental information received from the environmental information receiving functionality with a multiplicity of environmental patterns, and in response to ascertaining that the environmental information received from the environmental information receiving functionality matches at least one of the multiplicity of environmental patterns, automatically remotely tuning a threshold of at least one intrusion detector deployed in at least one of the some of the plurality of premises.

Preferably, the environmental information and the environmental patterns pertain to weather conditions at the at least some of the plurality of premises. Additionally or alternatively, the environmental information pertains to recent intrusions detected at the at least some of the plurality of premises.

Preferably, the plurality of premises includes at least one automobile. Additionally or alternatively, the plurality of premises includes at least one residence.

Preferably, the intrusion detectors include at least one motion detector. Additionally or alternatively, the intrusion detectors include at least one shock detector. Additionally or alternatively, the intrusion detectors include at least one environmental conditions detector.

Preferably, automatically remotely tuning the threshold of the at least one intrusion detector deployed in the at least a second of the plurality of premises includes lowering the threshold. Additionally or alternatively, automatically remotely tuning the threshold of the at least one intrusion detector deployed in the at least a second of the plurality of premises includes raising the threshold.

There is further provided in accordance with yet another preferred embodiment of the present invention a method for tuning a tunable intrusion shock detector including generating at least one shock wave in proximity to the tunable intrusion shock detector, each of the at least one shock wave having one of a plurality of discrete precalibrated threshold level associated therewith, ascertaining which of the at one least shock wave is indicative of an intrusion and retrieving at least one discrete intrusion-indicative precalibrated threshold level associated therewith, ascertaining which of the at one least shock wave is not indicative of an intrusion and retrieving at least one discrete non-intrusion indicative precalibrated threshold level associated therewith, and discretely tuning an intrusion threshold of the intrusion detector to a discrete intrusion-indicative precalibrated threshold level which is one of equal to and lower than the at least one discrete intrusion-indicative precalibrated threshold level and which is one of equal to and higher than the at least one discrete non-intrusion indicative precalibrated threshold.

There is further provided in accordance with yet another preferred embodiment of the present invention a method for tuning a tunable intrusion shock detector including generating at least one shock wave in proximity to the tunable intrusion shock detector, each of the at least one shock wave having one of a plurality of discrete precalibrated threshold level associated therewith, ascertaining which of the at one least shock wave is indicative of an intrusion and retrieving at least one discrete intrusion-indicative precalibrated threshold level associated therewith, and discretely tuning an intrusion threshold of the intrusion detector to the at least one discrete intrusion-indicative precalibrated threshold level.

There is further provided in accordance with yet another preferred embodiment of the present invention a method for tuning a tunable intrusion shock detector including generating at least one shock wave in proximity to the tunable intrusion shock detector, each of the at least one shock wave having one of a plurality of discrete precalibrated threshold level associated therewith, ascertaining which of the at one least shock wave is not indicative of an intrusion and retrieving at least one discrete non-intrusion indicative precalibrated threshold level associated therewith, and discretely tuning an intrusion threshold of the intrusion detector to the at least one discrete non-intrusion indicative precalibrated threshold level.

BRIEF DESCRIPTION OF THE DRAWINGS

The present invention will be understood and appreciated more fully from the following detailed description taken in conjunction with the drawings in which:

FIG. 1A is a simplified pictorial illustration of the operation of a system for automatically controlling intrusion thresholds of intrusion detectors deployed in a premises, constructed and operative in accordance with a preferred embodiment of the present invention;

FIG. 2A is a simplified pictorial illustration of the operation of a system for automatically remotely controlling intrusion thresholds of intrusion detectors deployed in a plurality of premises, constructed and operative in accordance with another preferred embodiment of the present invention;

FIGS. 2B and 2C are alternative simplified functional block diagrams of the system of FIG. 2A;

FIG. 4A is a simplified functional block diagram of an intrusion detector of FIGS. 1A-3C, constructed and operative in accordance with a preferred embodiment of the present invention.

DETAILED DESCRIPTION OF PREFERRED EMBODIMENTS

Figure 1B:
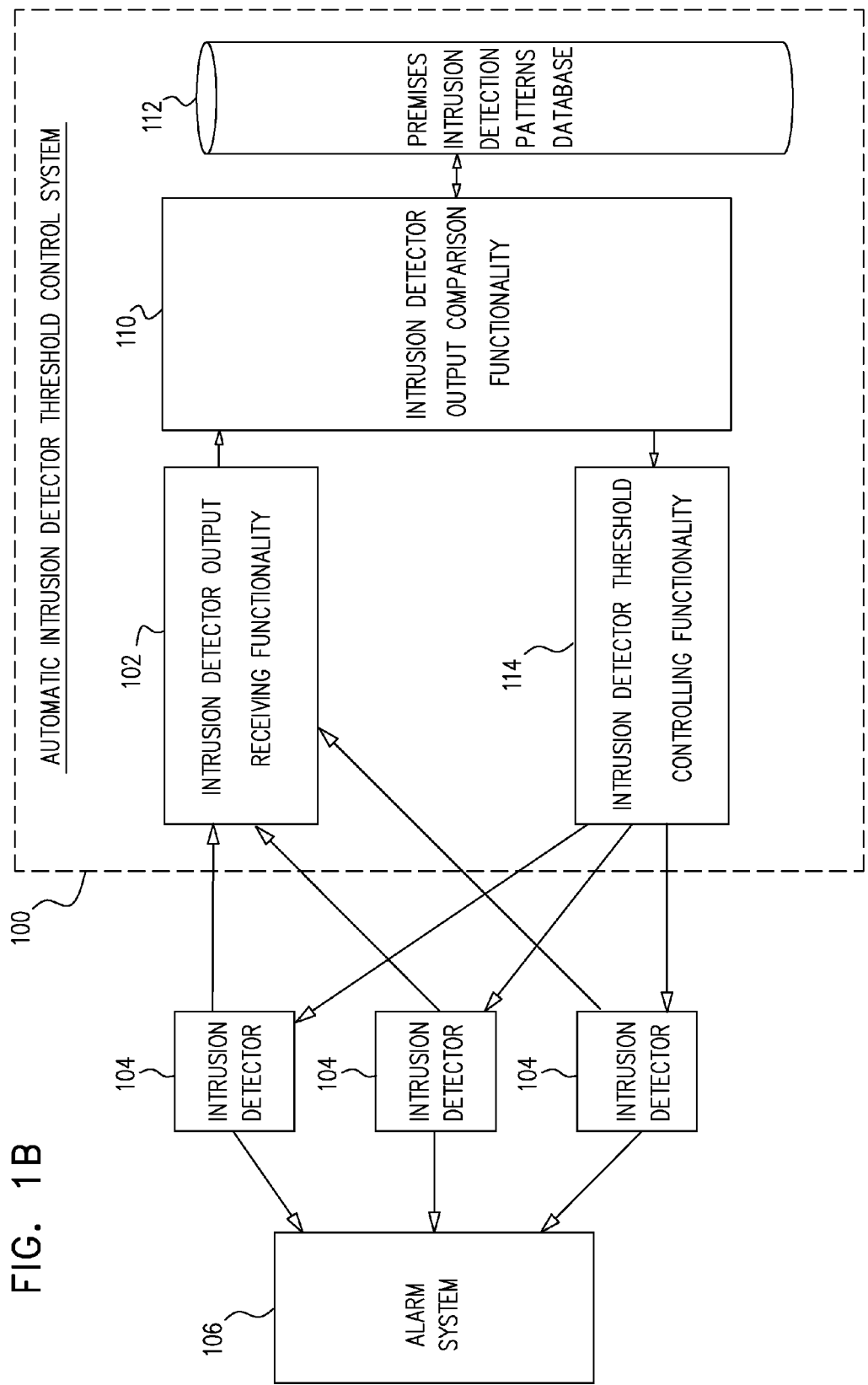
FIG. 1B is a simplified functional block diagram of the system of FIG. 1A.
Figure 1C:
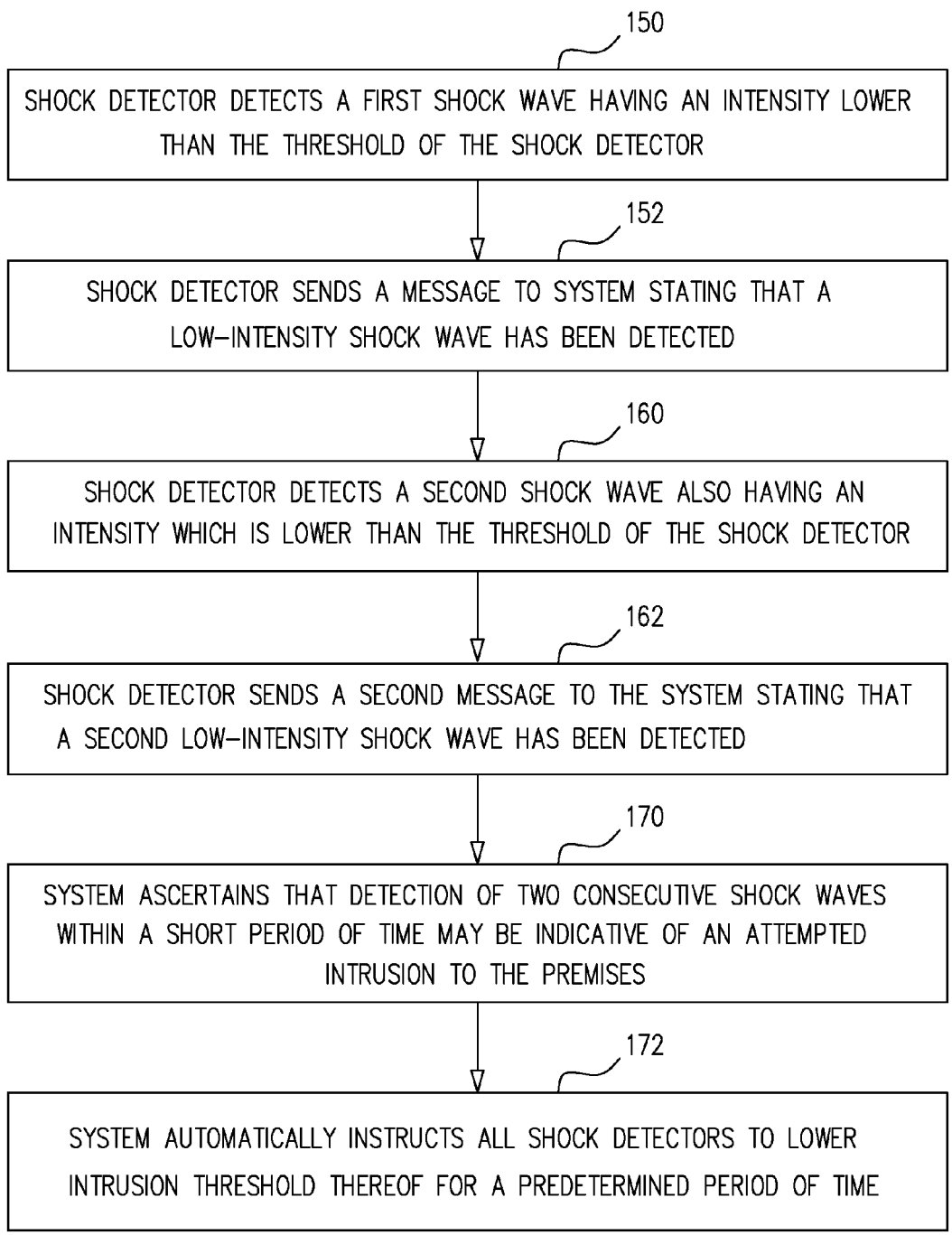
FIG. 1C is a simplified flowchart illustration of steps in the operation of the system of FIGS. 1A & 1B.

Reference is now made to FIG. 1A, which is a simplified pictorial illustration of the operation of a system for automatically controlling intrusion thresholds of intrusion detectors deployed in a premises, constructed and operative in accordance with a preferred embodiment of the present invention, to FIG. 1B, which is a simplified functional block diagram of the system of FIG. 1A, and to FIG. 1C, which is a simplified flowchart illustration of steps in the operation of the system of FIGS. 1A & 1B.

FIG. 1A is a pictorial illustration of the operation of the system in accordance with a first embodiment of the present invention, and will be described hereinbelow with reference to elements of the system as illustrated in FIG. 1B. The system of FIG. 1A preferably includes:

intrusion detector output receiving functionality operative to receive output from at least a first intrusion detector deployed in the premises;

intrusion detector output comparison functionality operative to compare the output from the first intrusion detector with at least one of a multiplicity of premises intrusion detection patterns; and intrusion detector threshold controlling functionality operative, in response to ascertaining that the output from the first intrusion detector matches at least one of the multiplicity of premises intrusion detection patterns, to automatically tune a threshold of at least a second intrusion detector deployed in the premises.

As shown in particular in FIG. 1B, the automatic intrusion detector threshold control system 100 preferably includes intrusion detector output receiving functionality 102 operative to receive outputs from a multiplicity of intrusion detectors 104 deployed in a premises. Intrusion detectors 104 may include, for example, motion detectors, shock detectors and environmental conditions detectors such as heat detectors.

Intrusion detectors 104 preferably communicate with an alarm system 106 deployed in the premises. It is appreciated that automatic intrusion detector threshold control system 100 may be located within alarm system 106 or vice versa.

System 100 also preferably includes intrusion detector output comparison functionality 110 operative to compare the outputs received from intrusion detectors 104 with premises intrusion detection patterns preferably stored in a premises intrusion detection patterns database 112.

System 100 also preferably includes intrusion detector threshold controlling functionality 114 operative, in response to ascertaining, by intrusion detector output comparison functionality 110, that the output from at least a first of intrusion detectors 104 matches at least one of the premises intrusion detection patterns stored in premises intrusion detection patterns database 112, to automatically tune an intrusion threshold of at least a second of intrusion detectors 104.

It is appreciated that, in response to ascertaining, by intrusion detector output comparison functionality 110, that the output from at least a first of intrusion detectors 104 matches at least one of the premises intrusion detection patterns stored in premises intrusion detection patterns database 112, an operator of system 100 may manually employ intrusion detector threshold controlling functionality 114 to tune an intrusion threshold of at least a second of intrusion detectors 104.

It is also appreciated that each of detectors 104 may also be manually tuned by an operator, either when being initially installed or subsequently thereto, as will be described hereinbelow with regard to FIGS. 4A & 4B.

Returning now to FIG. 1A, it is shown that shock detectors 120 and 122 are deployed adjacent to respective windows 130 and 132 of a residence 134, shock detectors 120 and 122 communicating with system 100 and with alarm system 106. It is appreciated that the intrusion thresholds of shock detectors 120 and 122 is tuned so to distinguish between events that justify sounding an alarm, such as a shock wave generated by a thief tampering with respective windows 130 and 132, and of events which do not justify sounding an alarm, such as a weaker shock wave generated by an animal or by weather conditions such as a thunderstorm.

As further shown in FIG. 1A, at a first time, such as at 02:00 AM, shock detector 122 deployed adjacent window 132 detects a shock wave originating from the exterior of residence 134 and in proximity to window 132, the shock wave having an intensity which is lower than the intrusion threshold of shock detector 122. As shown in stage 1 of FIG. 1A, responsive to detecting the shock wave, shock detector 122 sends a message to system 100 stating that a low-intensity shock wave has been detected. It is appreciated that due to the intensity of the detected shock wave being lower than the intrusion threshold of shock detector 122, detector 122 does not notify alarm system 106 of the detected shock wave, and therefore alarm system 106 does not sound an alarm.

As yet further shown in FIG. 1A, at a second time, such as at 02:05 AM, shock detector 122 deployed adjacent window 132 detects a second shock wave originating from the exterior of residence 134 and in proximity to window 132, the second shock wave also having an intensity which is lower than the intrusion threshold of shock detector 122. It is appreciated that alternatively, the second shock wave may be detected by a shock detector deployed adjacent to a second window, such as by shock detector 120 deployed adjacent window 130.

As shown in stage 2 of FIG. 1A, responsive to detecting the second shock wave, shock detector 122 sends a second message to system 100 stating that a second low-intensity shock wave has been detected. It is again appreciated that due to the intensity of the detected shock wave being lower than the intrusion threshold of shock detector 122, detector 122 does not notify alarm system 106 of the second detected shock wave, and therefore alarm system 106 does not sound an alarm.

Responsive to receiving the second message from detector 122 regarding the detection of the second low-intensity shock wave, system 100 ascertains that the detection of two consecutive shock waves within a short period of time may potentially be indicative of an attempted intrusion to the premises, despite both shock waves being of a low intensity. Therefore, as further shown in stage 3 of FIG. 1A, as a precautionary measure, system 100 automatically instructs both shock detector 120 and shock detector 122 to lower the intrusion thresholds thereof for a brief period of time, such as for thirty minutes. Lowering of the intrusion thresholds of detectors 120 and 122 ensures that if yet a third low-intensity shock wave is detected in proximity to either of windows 130 and 132, the corresponding one of detectors 120 and 122 will instruct alarm system 106 to sound an alarm.

It is appreciated that the period of time for which system 100 instructs shock detectors 120 and 122 to lower the intrusion thresholds thereof may be unlimited, and that system 100 may instruct shock detectors 120 and 122 to revert intrusion thresholds thereof to an earlier, higher, setting thereof in the future, for example in response to a future assessment of the probability of an intrusion occurring at residence 134.

It is a particular feature of this embodiment of the present invention that responsive to detecting an intrusion detection pattern by detector 122, system 100 is operative to tune the intrusion thresholds of detectors 120 and 122 to increase the security of residence 134 for a predetermined period of time. It is appreciated that the intrusion detection patterns stored in premises intrusion detection patterns database 112 may also include more complex patterns, such as patterns which comprise sequences of outputs originating from a multiplicity of detectors.

FIG. 1C is a simplified flowchart illustrating the aforementioned steps in the operation of automatic intrusion detector threshold control system 100. As shown in FIG. 1C, a shock detector deployed adjacent to a first window in a residence detects a first shock wave originating from the exterior of the residence and in proximity to the first window, the shock wave having an intensity which is lower than the intrusion threshold of the first shock detector (150). Responsive to detecting the first shock wave, the shock detector sends a message to the automatic intrusion detector threshold control system stating that a low-intensity shock wave has been detected (152). It is appreciated that due to the low intensity of the detected shock wave, the shock detector does not notify an alarm system deployed at the residence of the detected shock wave, and therefore the alarm system does not sound an alarm.

Shortly thereafter, the shock detector detects a second shock wave originating from the exterior of the residence and in proximity to the first window, the second shock wave also having an intensity which is lower than the intrusion threshold of the shock detector (160). Responsive to detecting the second shock wave, the shock detector sends a second message to the system stating that a second low-intensity shock wave has been detected (162). It is again appreciated that due to the low intensity of the second detected shock wave, the shock detector does not notify the alarm system deployed at the residence of the second detected shock wave, and therefore the alarm system does not sound an alarm.

Responsive to receiving the second message from the shock detector regarding the detection of the second low-intensity shock wave, the system ascertains that the detection of two consecutive shock waves within a short period of time may be indicative of an attempted intrusion to the premises, despite both shock waves being of a low intensity (170). Therefore, as a precautionary measure, the system automatically instructs all shock detectors deployed at the residence to lower the intrusion threshold thereof for a predetermined period of time (172). As described hereinabove, lowering of the intrusion thresholds of the shock detectors ensures that if yet a third low-intensity shock wave is detected by a shock detector adjacent to any windows of the residence, the shock detector will instruct the alarm system to sound an alarm.

Figure 2B:
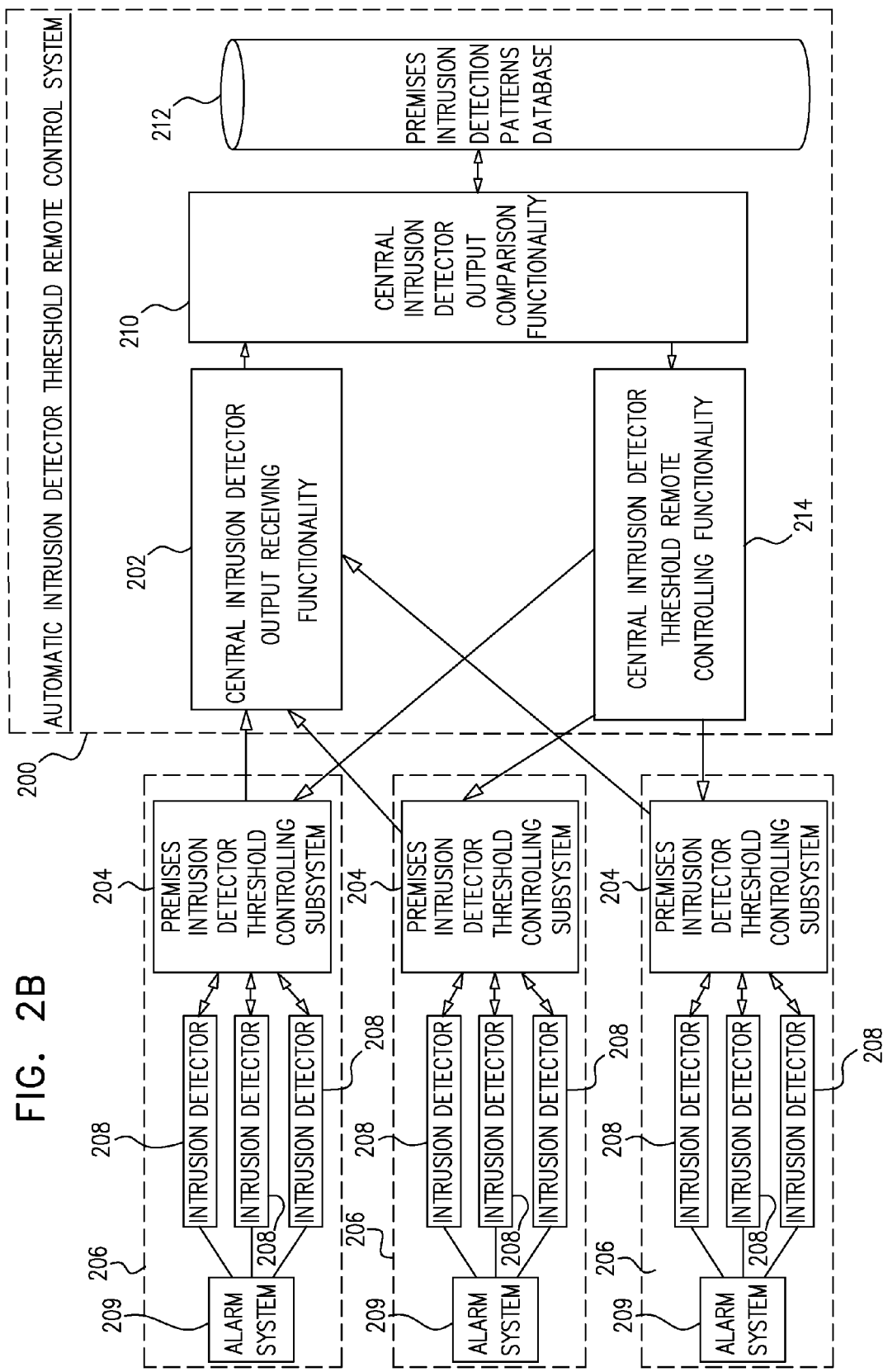
Figure 2D:
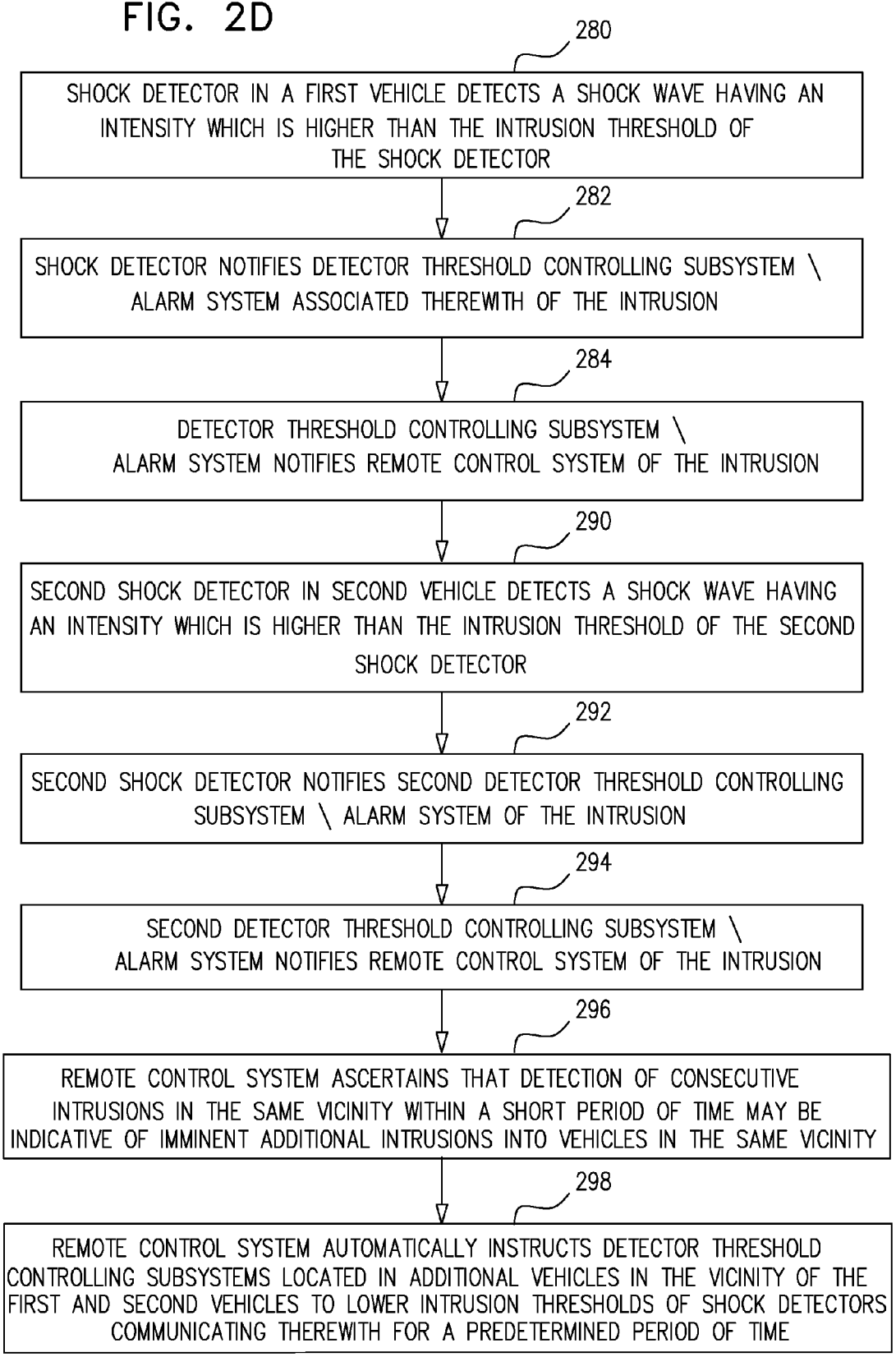
FIG. 2D is a simplified flowchart illustration of steps in the operation of the system of FIGS. 2A-2C.

Reference is now made to FIG. 2A, which is a simplified pictorial illustration of the operation of a system for automatically remotely controlling intrusion thresholds of intrusion detectors deployed in a plurality of premises, constructed and operative in accordance with another preferred embodiment of the present invention, to FIGS. 2B & 2C, which are alternative simplified functional block diagrams of the system of FIG. 2A, and to FIG. 2D, which is a simplified flowchart illustration of steps in the operation of the system of FIGS. 2A-2C.

FIG. 2A is a pictorial illustration of the operation of the system in accordance with a first embodiment of the present invention, and will be described hereinbelow with reference to elements of the system as illustrated in FIG. 2B. The system of FIG. 2A preferably includes:

central intrusion detector output receiving functionality operative to receive output from at least one intrusion detector deployed in a first of the plurality of premises;

central intrusion detector output comparison functionality operative to compare the output from the intrusion detector deployed in the first premises with a multiplicity of premises intrusion detection patterns; and central intrusion detector threshold remote controlling functionality operative, in response to ascertaining that the output from the intrusion detector deployed in the first premises matches at least one of the multiplicity of premises intrusion detection patterns, to automatically remotely tune a threshold of at least one intrusion detector deployed in at least a second of the plurality of premises.

System 200 preferably resides on a computer server connected to a computer network, such as a WAN or the internet, and may be located at any suitable location on the network. System 200 may alternatively reside in an internet cloud or in a social server network.

As shown in particular in FIG. 2B, the automatic intrusion detector threshold remote control system 200 preferably includes central intrusion detector output receiving functionality 202 operative to receive outputs from a plurality of premises intrusion detector threshold controlling subsystems 204 each deployed in a corresponding one of a multiplicity of premises 206. Each of premises intrusion detector threshold controlling subsystems 204 is preferably operative to communicate with and to receive outputs from intrusion detectors 208 deployed in the corresponding one of premises 206. Intrusion detectors 208 may include, for example, motion detectors, shock detectors and environmental conditions detectors such as heat detectors.

Intrusion detectors 208 preferably communicate with a premises alarm system 209. It is appreciated that each of premises intrusion detector threshold controlling subsystems 204 may be located within a corresponding one of alarm systems 209 as shown in alternative functional block diagram 2C.

System 200 also preferably includes central intrusion detector output comparison functionality 210 operative to compare the outputs received from premises intrusion detector threshold controlling subsystems 204 via receiving functionality 202 with premises intrusion detection patterns preferably stored in a premises intrusion detection patterns database 212.

System 200 also preferably includes central intrusion detector threshold remote controlling functionality 214 operative, in response to ascertaining, by central intrusion detector output comparison functionality 210, that the output from at least a first of premises intrusion detector threshold controlling subsystems 204 matches at least one of the premises intrusion detection patterns stored in premises intrusion detection patterns database 212, to automatically instruct at least a second of premises intrusion detector threshold controlling subsystems 204 to tune a threshold of intrusion detectors 208 communicating therewith.

It is appreciated that, in response to ascertaining, by central intrusion detector output comparison functionality 210, that the output from at least a first of premises intrusion detector threshold controlling subsystems 204 matches at least one of the premises intrusion detection patterns stored in premises intrusion detection patterns database 212, an operator of system 200 may manually employ central intrusion detector threshold remote controlling functionality 214 or any of premises intrusion detector threshold controlling subsystems 204 to tune a threshold of intrusion detectors 208 communicating therewith.

It is also appreciated that each of detectors 208 may also be tuned manually by an operator, either when being initially installed or subsequently thereto, as will be described hereinbelow with regard to FIGS. 4A & 4B.

Returning now to FIG. 2A, it is shown that vehicle alarm systems 220, 222 and 224 such as alarm system 209 of FIG. 2B, are preferably installed in respective vehicles 230, 232 and 234, vehicles 230, 232 and 234 being located in close proximity therebetween. Intrusion detectors 240, 242 and 244 such as intrusion detectors 208 of FIG. 2B are preferably installed in respective ones of vehicles 230, 232 and 234 and preferably communicate with respective alarm systems 220, 222 and 224, notifying alarm systems 220, 222 and 224 of events which may indicate an intrusion into the vehicle. Such events may include the detection of shock waves, tampering with or breakage of windows and windshields, and tampering with the ignition mechanism of the vehicle. It is appreciated that additional intrusion detectors may also be installed in vehicles 230, 232 and 234.

Preferably, the intrusion thresholds of intrusion detectors 240, 242 and 244 are tuned so to distinguish between events that justify sounding an alarm, such as a shock wave generated by a thief tampering with a windshield of a corresponding one of vehicles 230, 232 and 234, and of events which do not justify sounding an alarm, such as a weaker shock wave generated by an animal climbing upon the vehicle.

Premises intrusion detector threshold controlling subsystems 250, 252 and 254, such as premises intrusion detector threshold controlling subsystem 204 of FIG. 2B, are preferably provided within corresponding vehicles 230, 232 and 234 and preferably communicate with respective intrusion detectors 240, 242 and 244. It is appreciated that intrusion detector threshold controlling subsystems 250, 252 and 254 may be embedded within respective alarm systems 220, 222 and 224 and may communicate with respective intrusion detectors 240, 242 and 244 either directly or via respective alarm systems 220, 222 and 224. It is appreciated that communication between alarm systems 220, 222 and 224, respective intrusion detectors 240, 242 and 244 and respective intrusion detector threshold controlling subsystems 250, 252 and 254 may be either wired or wireless.

Premises intrusion detector threshold controlling subsystems 250, 252 and 254 preferably remotely communicate with automatic intrusion detector threshold remote control system 200. It is appreciated that system 200 may be located in a central security monitoring service which, for example, monitors vehicles and residences which have subscribed to the service and which communicates with alarm systems 220, 222 and 224. It is also appreciated that communication between system 200 and detector threshold controlling subsystems 250, 252 and 254 is preferably wireless via, for example, cellular telephone infrastructure.

As further shown in FIG. 2A, at a first time, such as at 03:00 AM, shock detector 240 installed in vehicle 230 detects a shock wave in proximity to a window of vehicle 230, the shock wave having an intensity which is higher than the intrusion threshold of shock detector 240, therefore being indicative of an intrusion into vehicle 230. Responsive to detecting the shock wave, shock detector 240 preferably notifies alarm system 220 of the intrusion, and alarm system 220 preferably sounds an alarm. Additionally, shock detector 240 preferably notifies detector threshold controlling subsystem 250 of the intrusion. It is appreciated that alternatively, alarm system 220 may notify detector threshold controlling subsystem 250 of the intrusion.

Additionally, responsive to receiving notification of the intrusion, detector threshold controlling subsystem 250 preferably notifies system 200 of the intrusion. It is appreciated that alternatively, alarm system 220 may notify system 200 of the intrusion.

As yet further shown in FIG. 2A, at a second time, such as at 03:10 AM, shock detector 242 installed in vehicle 232 detects a shock wave in proximity to a window of vehicle 232, the shock wave having an intensity which is higher than the intrusion threshold of shock detector 242, therefore being indicative of an intrusion into vehicle 232. Responsive to detecting the shock wave, shock detector 242 preferably notifies alarm system 222 of the intrusion, and alarm system 222 preferably sounds an alarm. Additionally, shock detector 242 preferably notifies detector threshold controlling subsystem 252 of the intrusion. It is appreciated that alternatively, alarm system 222 may notify detector threshold controlling subsystem 252 of the intrusion.

Responsive to receiving notification of an intrusion of vehicle 232, system 200 ascertains that the detection of two consecutive intrusions into vehicles in the same vicinity within a short period of time may be indicative of a high probability of imminent additional intrusions into vehicles in the same vicinity. Therefore, as further shown in FIG. 2A, as a precautionary measure, system 200 automatically instructs detector threshold controlling subsystem 254 located in third vehicle 234 to lower the intrusion threshold of shock detector 244 communicating therewith for a brief period of time, such as for the remainder of the night, in anticipation of an imminent intrusion into vehicle 234. Lowering of the intrusion threshold of shock detector 244 ensures that any attempt at intrusion into vehicle 234 will be detected even if a shock wave generated by such an intrusion is of a low intensity.

It is appreciated that the period of time for which system 200 instructs shock detector 244 to lower the intrusion thresholds thereof may be unlimited, and that system 200 may instruct shock detector 244 to revert the intrusion threshold thereof to an earlier setting thereof in the future, for example in response to a future assessment of the probability of an intrusion occurring at vehicle 234.

It is a particular feature of this embodiment of the present invention that responsive to ascertaining, by system 200, that a pattern of multiple intrusions into premises in a particular vicinity is currently taking place, system 200 is operative to tune the intrusion thresholds of detectors in additional premises, such as vehicle 234, to thereby increase the security of vehicle 234 for a predetermined period of time.

FIG. 2D is a simplified flowchart illustrating the aforementioned steps in the operation of automatic intrusion detector threshold remote control system 200. As shown in FIG. 2D, a shock detector installed in a first vehicle detects a shock wave in proximity to a window of the vehicle, the shock wave having an intensity which is higher than the intrusion threshold of the shock detector, therefore being indicative of an intrusion into the vehicle (280). Responsive to detecting the shock wave, the shock detector preferably notifies a detector threshold controlling subsystem associated therewith of the intrusion (282). It is appreciated that additionally or alternatively, the shock detector may notify an alarm system associated therewith of the intrusion and the alarm system may notify the detector threshold controlling subsystem of the intrusion.

Responsive to receiving notification of the intrusion, the detector threshold controlling subsystem preferably notifies the remote control system of the intrusion (284). It is appreciated that alternatively, the alarm system associated with the detector may notify the system of the intrusion.

Shortly thereafter, a second shock detector installed in a second vehicle located in close vicinity to the first vehicle detects a second shock wave in proximity to a window of the second vehicle, the second shock wave also having an intensity which is higher than the intrusion threshold of the second shock detector, therefore being indicative of an intrusion into the second vehicle (290). Responsive to detecting the second shock wave, the second shock detector preferably notifies a second detector threshold controlling subsystem associated therewith of the intrusion (292). It is again appreciated that additionally or alternatively, the second shock detector may notify a second alarm system associated therewith of the intrusion and the second alarm system may notify the detector threshold controlling subsystem of the intrusion.

Responsive to receiving notification of the intrusion, the second detector threshold controlling subsystem preferably notifies the remote control system of the intrusion (294). It is appreciated that alternatively, the second alarm system associated with the second shock detector may notify the system of the intrusion.

Responsive to receiving notification of an intrusion of the second vehicle, the remote control system ascertains that the detection of two consecutive intrusions into vehicles in the same vicinity within a short period of time may be indicative of a high probability of imminent additional intrusions into vehicles in the same vicinity occurring (296). Therefore, as a precautionary measure, the remote control system automatically instructs detector threshold controlling subsystems installed in additional vehicles located in the vicinity of the first and second vehicles to lower the intrusion threshold of shock detectors communicating therewith for a predetermined period of time, in anticipation of imminent intrusions into additional vehicles (298). As described hereinabove, lowering of the intrusion thresholds of shock detectors in the additional vehicles ensures that any attempt at intrusion into the vehicles will be detected even if a shock wave generated by such an intrusion is of a low intensity.

Figure 3A:
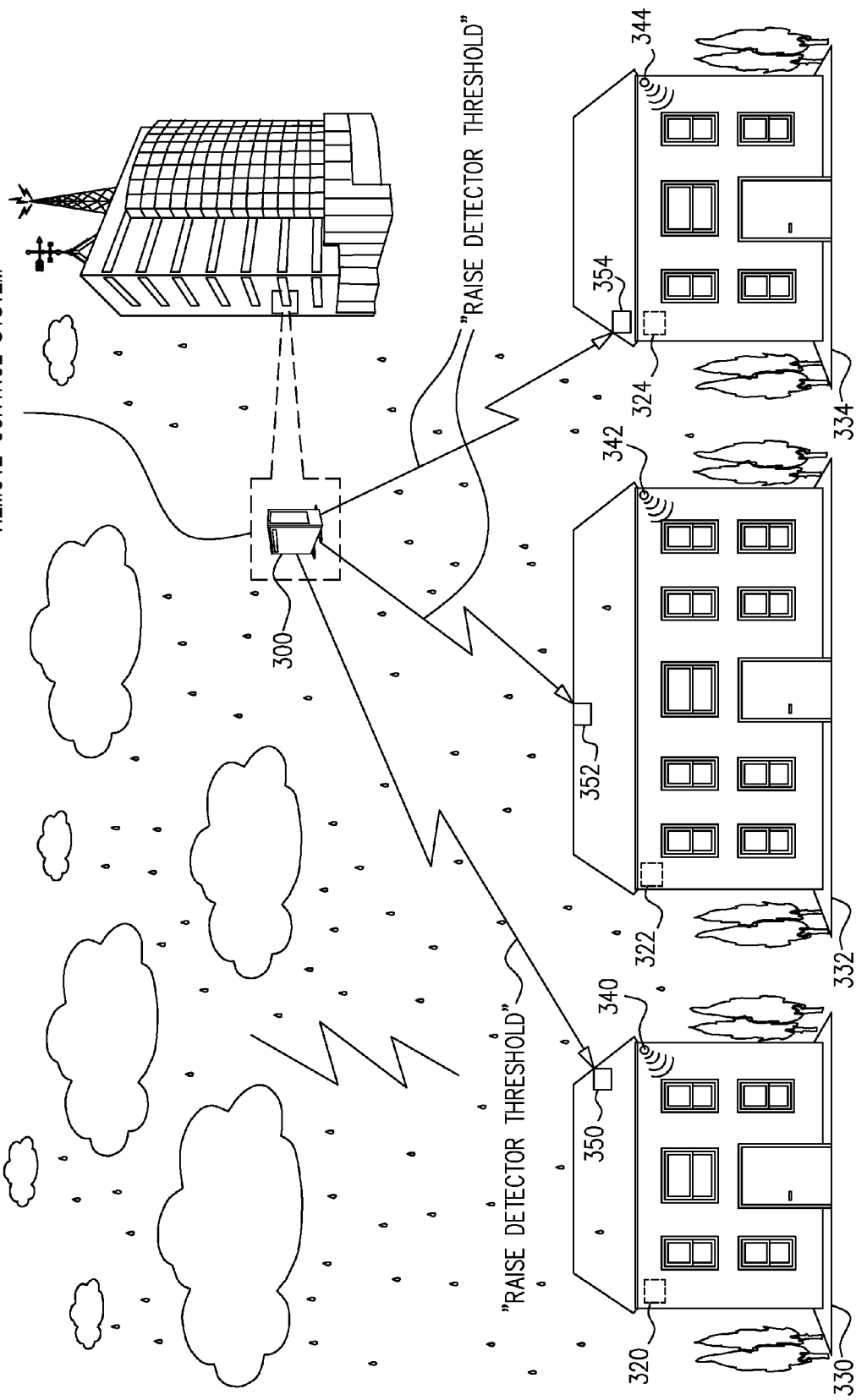
FIG. 3A is a simplified pictorial illustration of the operation a system for automatically remotely controlling intrusion thresholds of intrusion detectors deployed in a plurality of premises, constructed and operative in accordance with yet another preferred embodiment of the present invention.
Figure 3B:
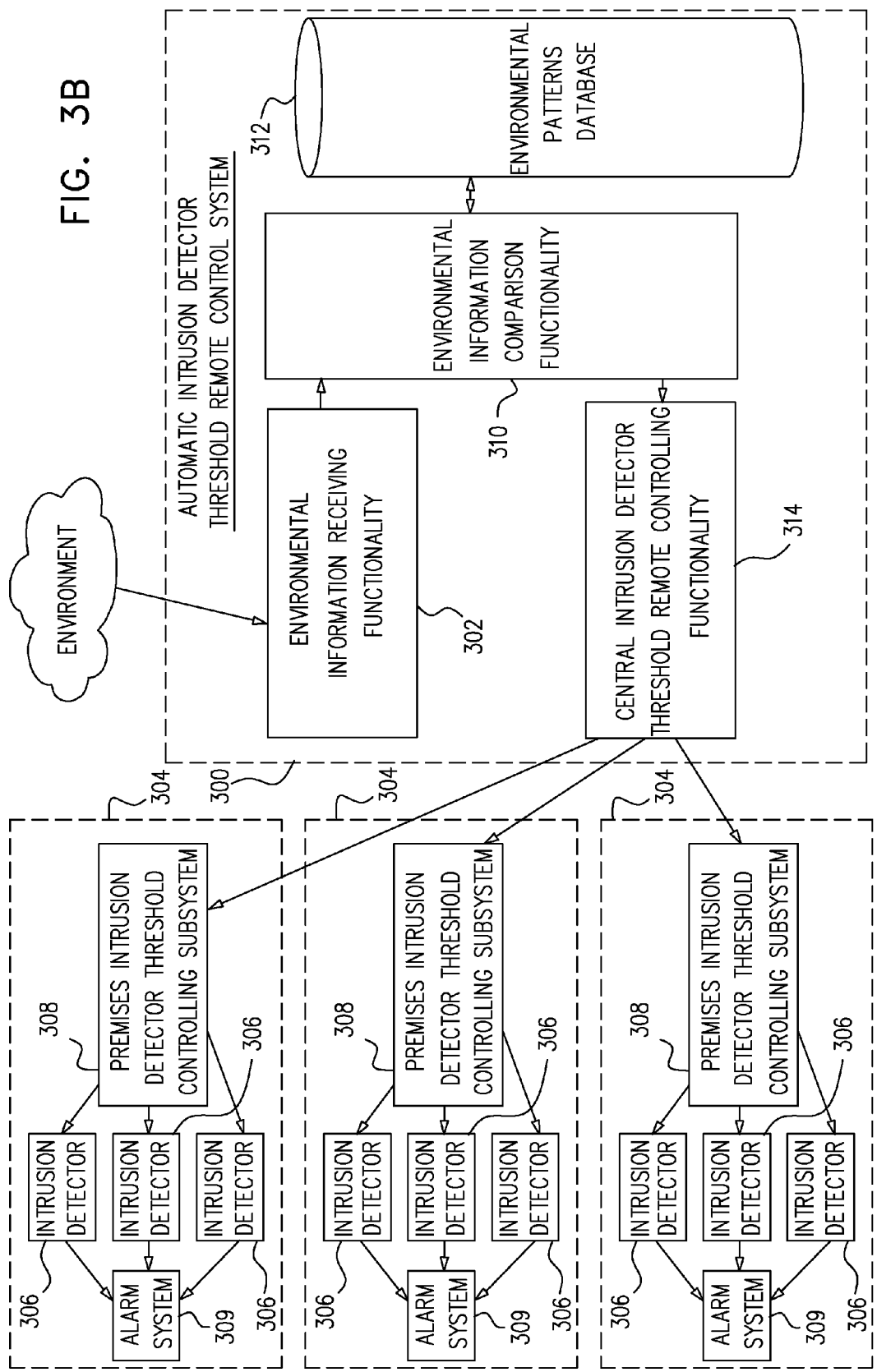
FIG. 3B is a simplified functional block diagram of steps in the operation of the system of FIG. 3A.
Figure 3C:
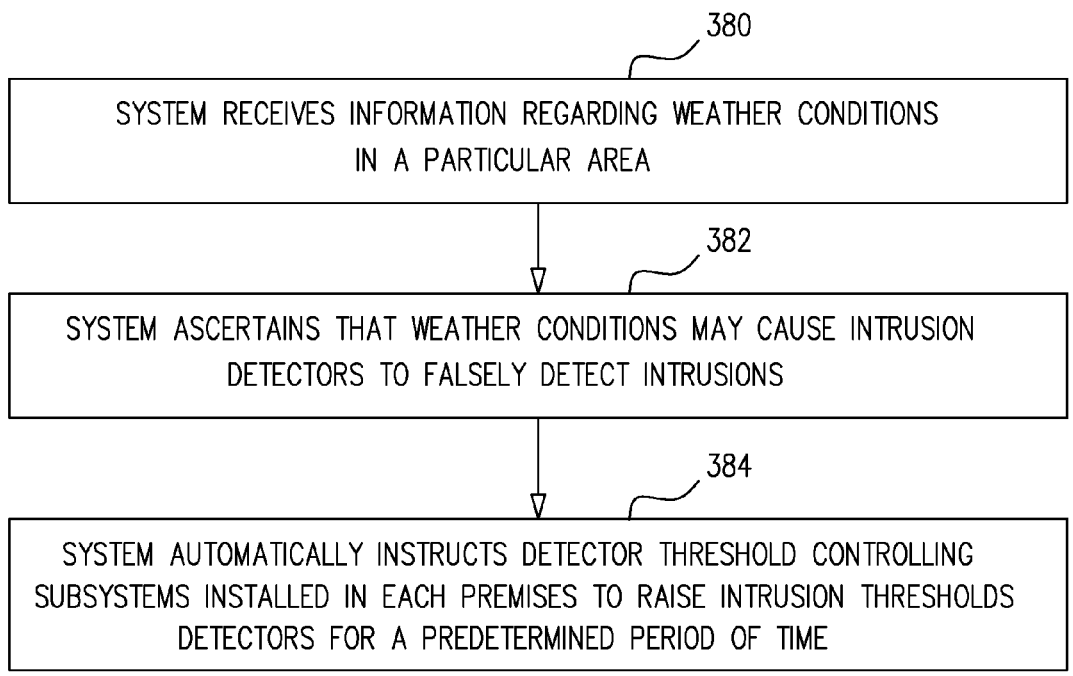
FIG. 3C is a simplified flowchart illustration of steps in the operation of the system of FIGS. 3A & 3B.

Reference is now made to FIG. 3A, which is a simplified pictorial illustration of the operation of a system for automatically remotely controlling intrusion thresholds of intrusion detectors deployed in a plurality of premises, constructed and operative in accordance with yet another preferred embodiment of the present invention, to FIG. 3B, which is a simplified functional block diagram of the system of FIG. 3A, and to FIG. 3C, which is a simplified flowchart illustration of steps in the operation of the system of FIGS. 3A & 3B.

FIG. 3A is a pictorial illustration of the operation of the system in accordance with a first embodiment of the present invention, and will be described hereinbelow with reference to elements of the system as illustrated in FIG. 3B. The system of FIG. 3A preferably includes:

environmental information receiving functionality operative to receive environmental information pertaining to the environment of at least some of the plurality of premises;

environmental information comparison functionality operative to compare the environmental information received from the environmental information receiving functionality with a multiplicity of environmental patterns; and central intrusion detector threshold remote controlling functionality operative, in response to ascertaining, by the environmental information comparison functionality, that the environmental information received from the environmental information receiving functionality matches at least one of the multiplicity of environmental patterns, to automatically remotely tune a threshold of at least one intrusion detector deployed in at least one of the some of the plurality of premises.

System 300 preferably resides on a computer server connected to a computer network, such as a WAN or the internet, and may be located at any suitable location on the network. System 300 may alternatively reside in an internet cloud or in a social server network.

As shown in particular in FIG. 3B, the automatic intrusion detector threshold remote control system 300 preferably includes environmental information receiving functionality 302 operative to receive environmental information pertaining to the environment of a plurality of premises 304. It is appreciated that the environmental information pertaining to the environment of premises 304 may include, for example, weather conditions in the environment of premises 304 or law enforcement alerts regarding the likelihood of intrusions in the area of premises 304.

Intrusion detectors 306 are preferably deployed in each of premises 304 and preferably communicate with a premises intrusion detector threshold controlling subsystem 308 and with a premises alarm system 309. Intrusion detectors 306 may include, for example, motion detectors, shock detectors and environmental conditions detectors such as heat detectors. It is appreciated that each of premises intrusion detector threshold controlling subsystems 308 may be located within a corresponding one of alarm systems 309.

System 300 also preferably includes environmental information comparison functionality 310 operative to compare the environmental information received from environmental information receiving functionality 302 with a multiplicity of environmental patterns preferably stored in an environmental patterns database 312.

System 300 also preferably includes central intrusion detector threshold remote controlling functionality 314 operative, in response to ascertaining, by environmental information comparison functionality 310, that the environmental information received from environmental information receiving functionality 302 matches at least one of the multiplicity of environmental patterns stored in environmental patterns database 312, to automatically instruct at least one of premises intrusion detector threshold controlling subsystems 308 to tune a threshold of intrusion detectors 306 communicating therewith.

It is appreciated that, in response to ascertaining, by environmental information comparison functionality 310, that the environmental information received from environmental information receiving functionality 302 matches at least one of the multiplicity of environmental patterns stored in environmental patterns database 312, an operator of system 300 may manually employ central intrusion detector threshold remote controlling functionality 314 or any of premises intrusion detector threshold controlling subsystems 308 to tune a threshold of intrusion detectors 306 communicating therewith.

It is also appreciated that each of detectors 306 may also be tuned manually by an operator, either when being initially installed or subsequently thereto, as will be described hereinbelow with regard to FIGS. 4A & 4B.

Returning now to FIG. 3A, it is shown that premises alarm systems 320, 322 and 324 such as alarm system 309 of FIG.

3B, are preferably installed in respective premises 330, 332 and 334, premises 330, 332 and 334 being located in close proximity therebetween. Intrusion detectors 340, 342 and 344 such as intrusion detectors 306 of FIG. 3B are preferably installed in respective ones of premises 330, 332 and 334 and preferably communicate with respective alarm systems 320, 322 and 324, notifying alarm systems 320, 322 and 324 of events which may indicate an intrusion into the premises. Such events may include the detection of shock waves, tampering with or breakage of windows, and tampering with a locking mechanism of the premises. It is appreciated that additional intrusion detectors may also be installed at premises 330, 332 and 334.

Preferably, the intrusion thresholds of intrusion detectors 340, 342 and 344 are tuned so to distinguish between events that justify sounding an alarm, such as a shock wave generated by a thief tampering with a window of a corresponding one of premises 330, 332 and 334, and of events which do not justify sounding an alarm, such as a weaker shock wave generated by an animal climbing on the premises.

Premises intrusion detector threshold controlling subsystems 350, 352 and 354, such as premises intrusion detector threshold controlling subsystem 308 of FIG. 3B, are preferably provided within corresponding premises 330, 332 and 334 and preferably communicate with respective intrusion detectors 340, 342 and 344. It is appreciated that intrusion detector threshold controlling subsystems 350, 352 and 354 may be embedded within respective alarm systems 320, 322 and 324, and may communicate with respective intrusion detectors 340, 342 and 344 either directly or via respective alarm systems 320, 322 and 324. It is appreciated that communication between alarm systems 320, 322 and 324, respective intrusion detectors 340, 342 and 344 and respective intrusion detector threshold controlling subsystems 350, 352 and 354 may be either wired or wireless.

Premises intrusion detector threshold controlling subsystems 350, 352 and 354 preferably remotely communicate with automatic intrusion detector threshold remote control system 300. It is appreciated that system 300 may be located in a central security monitoring service which, for example, monitors vehicles and residences which have subscribed to the service and which communicates with alarm systems 320, 322 and 324. It is also appreciated that communication between system 300 and detector threshold controlling subsystems 350, 352 and 354 may be wired or wireless via, for example, cellular telephone infrastructure or a municipal WiFi network.

System 300 is operative to receive information regarding weather conditions in the area of premises 330, 332 and 334, as via weather monitoring systems communicating therewith or via weather information service providers. Responsive receiving the weather information, system 300 is operative to ascertain that weather conditions in the area of premises 330, 332 and 334 may cause intrusion detectors 340, 342 and 344 to falsely detect an intrusion at a corresponding one of premises 330, 332 and 334. Such a false detection may be caused, for example, by thunder causing a shock wave to impact a window of a premises.

Responsive to ascertaining that weather conditions may cause intrusion detectors to falsely detect an intrusion at a premises, system 300, as a precautionary measure, automatically instructs detector threshold controlling subsystems 350, 352 and 354 located in corresponding premises 330, 332 and 334 to raise the intrusion threshold of corresponding intrusion detectors 340, 342 and 344 communicating therewith for a brief period of time, such as for the expected duration of the current weather conditions. Raising the intrusion thresholds of intrusion detectors 340, 342 and 344 ensures that shock waves resulting from temporary weather conditions will not cause intrusion detectors 340, 342 and 344 to falsely detect an intrusion to premises 330, 332 and 334.

It is appreciated that the period of time for which system 300 instructs intrusion detectors 340, 342 and 344 to lower the intrusion thresholds thereof may be unlimited, and that system 300 may instruct intrusion detectors 340, 342 and 344 to revert the intrusion thresholds thereof to earlier settings thereof in the future, for example in response to changing weather conditions in the vicinity of premises 330, 332 and 334.

It is further appreciated that responsive to receiving information pertaining to calm weather conditions in the area of premises 330, 332 and 334, system 300 is also operative to automatically instruct detector threshold controlling subsystems 350, 352 and 354 located in corresponding premises 330, 332 and 334 to lower the intrusion threshold of corresponding intrusion detectors 340, 342 and 344 communicating therewith for an expected duration of the calm weather conditions. Lowering the intrusion thresholds of intrusion detectors 340, 342 and 344 ensures that shock waves will not be misinterpreted as resulting from weather conditions and will therefore enable intrusion detectors 340, 342 and 344 to more reliably detect intrusions to premises 330, 332 and 334.

It is a particular feature of this embodiment of the present invention that responsive to ascertaining, by system 300, that a current weather pattern in a particular vicinity may cause alarm systems in the vicinity to sound false alarms, system 300 is operative to tune the intrusion thresholds of detectors in premises in the vicinity, to thereby reduce the probability of sounding false alarms.

FIG. 3C is a simplified flowchart illustrating the aforementioned steps in the operation of system 300. As shown in FIG. 3C, the system initially receives information regarding weather conditions in a particular area (380), as via weather monitoring systems communicating therewith or via weather information service providers. Responsive to receiving the weather information, the system ascertains that weather conditions in the area may cause intrusion detectors installed in premises in the area to falsely detect intrusions at corresponding premises (382). Such a false detection may be caused, for example, by thunder causing a shock wave to impact a window of a premises.

Responsive to ascertaining that weather conditions may cause intrusion detectors to falsely detect an intrusion at a premises, the system, as a precautionary measure, automatically instructs detector threshold controlling subsystems installed in each of the premises and communicating with corresponding intrusion detectors installed in each of the premises to raise the intrusion threshold of the intrusion detectors communicating therewith for a brief period of time, such as for the expected duration of the current weather conditions (384). Raising the intrusion thresholds of the intrusion detectors ensures that shock waves resulting from temporary weather conditions will not cause intrusion detectors to falsely detect an intrusion to corresponding premises.

Reference is now made to FIG. 4A, which is a simplified functional block diagram of a shock wave detector of FIGS. 1A-3C, constructed and operative in accordance with a preferred embodiment of the present invention. The shock wave detector of FIG. 4A is preferably employed as part of the systems of FIGS. 1A-3C, such as intrusion detectors 104, 208 and 306.

As described hereinabove with reference to FIGS. 1A-3C, intrusion thresholds of intrusion detectors 104, 208 and 306 are operative to be tuned so to distinguish between events that justify sounding an alarm, such as a shock wave generated by a thief tampering with a window of a premises and of events which do not justify sounding an alarm, such as shock waves generated by weather conditions. As further described hereinabove, the intrusion threshold of the intrusion detectors may be tuned either by local intrusion detector threshold controlling functionality such as intrusion detector threshold controlling functionality 114 of FIG. 1B, or by remote\central intrusion detector threshold remote controlling functionality such as premises intrusion detector threshold controlling subsystems 204 communicating with central intrusion detector threshold remote controlling functionality 214 of FIG. 2B and premises intrusion detector threshold controlling subsystems 308 communicating with central intrusion detector threshold remote controlling functionality 314 of FIG. 3B.

Additionally, as further described hereinabove with reference in particular to FIGS. 1B, 2B and 3B, each of detectors 104, 208 and 306 may also be tuned manually by an operator, either when being initially installed or subsequently thereto.

Figure 4B:
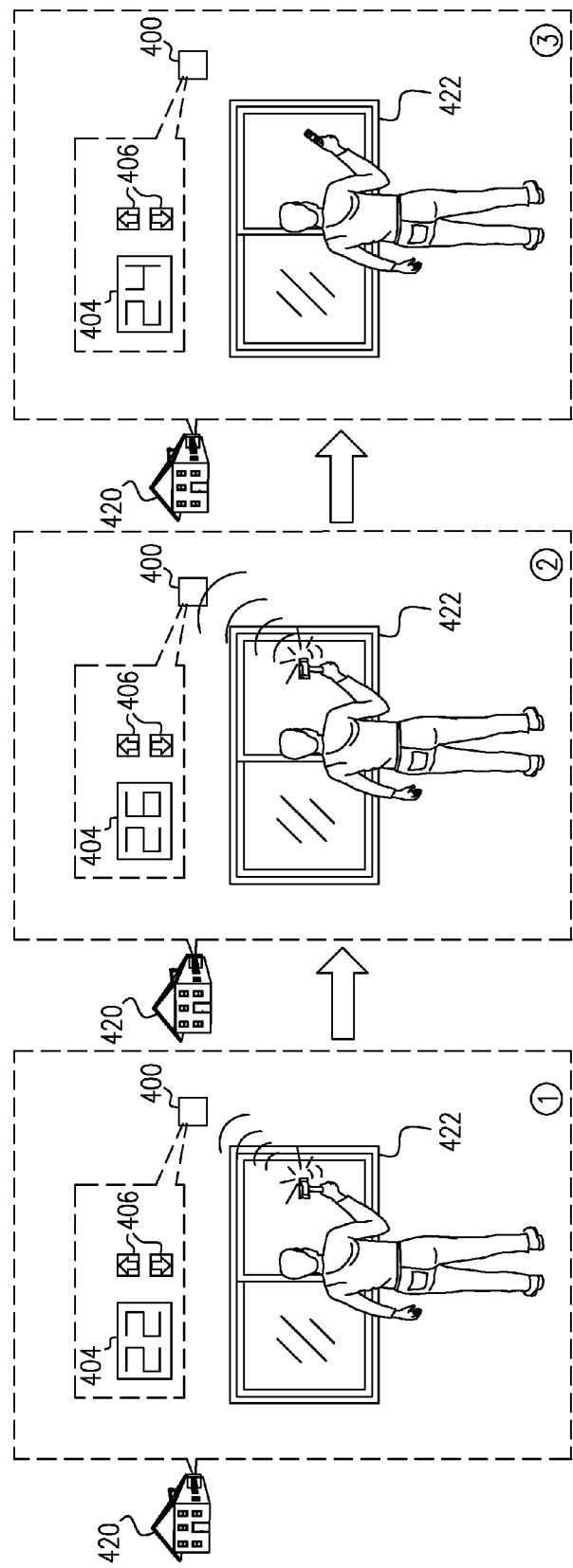
FIG. 4B is a simplified pictorial illustration of manual tuning of the intrusion detector of FIG. 4A.

It is a particular feature of the present invention that the intrusion thresholds of the shock wave detector of FIGS. 4A and 4B is adjusted via a discrete input device such as, for example, a push button, and is preferably displayed on a discrete type display such as, for example, a seven segment display, an LCD dot matrix display element, a colored LED display element, or an array of LED elements forming a bar display.

It is further appreciated that discrete enumeration of levels of the intrusion threshold of the shock wave detector of FIGS. 4A and 4B enables tuning the intrusion threshold to a precise numeric value representing one of a plurality of discrete precalibrated threshold levels. For example, an operator of an intrusion detection system employing the shock wave detector may wish to either manually or remotely adjust the intrusion threshold of the shock wave detector and to test the shock wave detector at the new threshold, while being able to revert to the precise previous threshold in a case where the new threshold proves to be unsuitable. It is further appreciated that discrete tuning of the intrusion thresholds of shock wave detectors such as detectors 104, 208 and 306 is operative to provide uniform tuning of all shock wave detector employed in the systems of FIGS. 1A-3C.

As shown in FIG. 4A, a shock wave detector 400 comprises a transceiver 402 and a discrete numeric display 404, embodied in the form of a seven-segment display (SSD). Numeric display 404 is preferably operable to display the intrusion threshold of shock wave detector 400. It is appreciated that shock wave detector 400 may be configured to operate over any predetermined discrete numerical range of shock threshold levels.

Shock wave detector 400 also preferably includes two discrete input actuators 406, each preferably embodied in the form of a pushbutton. Actuators 406 are operable for manually setting the intrusion threshold of shock wave detector 400 which is preferably stored in memory 408 of shock wave detector 400.

It is appreciated that the intrusion threshold of shock wave detector 400 may also be automatically transmitted to shock wave detector 400, via transceiver 402, from remote control functionality such as a household control panel of an intrusion detection system which employs shock wave detector 400, intrusion detector threshold controlling functionality 114 of FIG. 1B, premises intrusion detector threshold controlling subsystems 204 of FIG. 2B and premises intrusion detector threshold controlling subsystems 308 of FIG. 3B.

Shock wave detector 400 also preferably includes a microphone 410 for detection of acoustic events which may be indicative of an intrusion, in addition to shock sensing functionality 412. Shock sensing functionality 412 is preferably operative to sense shock waves and, additionally, to analyze corresponding acoustic events received by microphone 410 and to employ, inter alia, the intrusion threshold stored in memory 408, to ascertain whether the combination of the sensed shock waves and corresponding acoustic events are indicative of an intrusion. Upon ascertaining that the acoustic events are indicative of an intrusion, Detector 400 is preferably operative to transmit an indication of the intrusion to an alarm system communicating therewith, such as alarm system 106 of FIG. 1B, 209 of FIGS. 2B and 309 of FIG. 3B.

Detector 400 also preferably includes a LED display 414 for displaying, for example, an indication of an intrusion. A power source such as a battery 416 is also preferably provided. Alternatively, detector 400 may be connected to a wired power source.

Reference is now made to FIG. 4B, which is a simplified pictorial illustration of manual tuning of the intrusion detector of FIG. 4A. As described hereinabove with reference to FIG. 4A, intrusion detector 400 of FIG. 4A preferably includes two discrete input actuators 406, each preferably embodied in the form of a pushbutton, which are operable for manually setting the intrusion threshold of intrusion detector 400.

As shown in step 1 of FIG. 4B, an operator wishing to tune the intrusion threshold of detector 400 of a residence 420 initially generates a relatively weak shock wave emitted by a window 422 by hitting the window with a solid object, such as a hammer. The relatively weak shock wave is one which the operator deems as too weak to be indicative of an intrusion of window 422. The operator notes that the relatively weak shock wave was sensed by shock sensing functionality 412 of detector 400 and was determined thereby to have an intensity of 22, as displayed on display numeric display 404 of detector 400.

Thereafter, as shown in step 2 of FIG. 4B, the operator generates a relatively strong shock wave emitted by window 422 by hitting the window with a greater intensity relative to step 1. The relatively strong shock wave is one which the operator deems as to be strong enough to be indicative of an intrusion of window 422. The operator notes that the string weak shock wave was sensed by shock sensing functionality 412 of detector 400 and was determined thereby to have an intensity of 26, as displayed on display numeric display 404 of detector 400.

Thereafter, as shown in step 3 of FIG. 4B, responsive to ascertaining that a suitable intrusion threshold for window would be between a threshold which would deem the relatively strong shock wave of step 2 as being indicative of an intrusion of window 422 while deeming the relatively weak shock wave of step 1 as not being indicative of an intrusion of window 422, the operator employs actuators 406 of detector 400 to set the intrusion threshold of detector 400 as 24.

It is appreciated that tuning of the intrusion threshold of detector 400 in step 3 of FIG. 4B may also be performed automatically. For example, responsive to the operator generating a multiplicity of shock waves, each of the shock waves having a different intensity, detector 400 may calculate an average intensity of the multiplicity of shock waves and tune the intrusion threshold of detector 400 to be the average intensity. Alternative examples of automatic tuning of detector 400 may include automatic tuning the intrusion threshold of detector 400 to be a threshold which is higher than the calculated average intensity by a predetermined number of levels, or a threshold which is an average of the three strongest shock waves generated by the operator.

It is also appreciated that once tuned, the intrusion threshold of detector 400 may be shared among all intrusion detectors deployed in the residence. For example, detector 400 may transmit the intrusion threshold thereof to an automatic intrusion detector threshold control system such as automatic intrusion detector threshold control system 100 of FIGS. 1A & 1B, premises intrusion detector threshold controlling subsystem 204 of FIGS. 2A & 2B, and premises intrusion detector threshold controlling subsystem 308 of FIGS. 3A & 3B. The control system may thereafter transmit the intrusion threshold to all intrusion detectors of residence 420.

Alternatively, control system 100 may ascertain that the intrusion threshold received from detector 400 is suitable to detect intrusions of window 420, however for other, more vulnerable openings of residence 420, a lower intrusion threshold is more appropriate. Similarly, control system 100 may ascertain that for other, less vulnerable openings of residence 420, a higher intrusion threshold is more appropriate.

It is yet further appreciated that intrusion thresholds of all or some of intrusion detectors deployed in residence 420 may be manually tuned by an operator employing a threshold control system such as automatic intrusion detector threshold control system 100 of FIGS. 1A & 1B, premises intrusion detector threshold controlling subsystem 204 of FIGS. 2A & 2B, and premises intrusion detector threshold controlling subsystem 308 of FIGS. 3A & 3B which communicates with all intrusion detectors of residence 420. Alternatively, intrusion thresholds of all or some of intrusion detectors deployed in residence 420 may be automatically tuned by the threshold control system as described hereinabove.

Similarly, it is yet further appreciated that central intrusion detector threshold remote controlling functionality such as central intrusion detector threshold remote controlling functionality 214 of automatic intrusion detector threshold remote control system 200 of FIGS. 2A & 2B and central intrusion detector threshold remote controlling functionality 314 of automatic intrusion detector threshold remote control system 300 of FIGS. 3A & 3B may be employed to either manually or automatically tune intrusion thresholds of intrusion detectors deployed in premises communicating therewith.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for automatically controlling intrusion thresholds of intrusion detectors deployed in a premises, said system comprising:
   intrusion detector output receiving functionality operative to receive at least one output from at least a first intrusion detector deployed in said premises;
   intrusion detector output comparison functionality operative to compare said at least one output from said at least a first intrusion detector with at least one of a multiplicity of premises intrusion detection patterns; and
   intrusion detector threshold controlling functionality operative, in response to ascertaining that said at least one output from said at least a first intrusion detector matches at least one of said multiplicity of premises intrusion detection patterns, to automatically tune a threshold of at least a second intrusion detector deployed in said premises.

2. A system for automatically controlling intrusion thresholds of intrusion detectors deployed in a premises according to claim 1 and wherein said at least one of said multiplicity of premises intrusion detection patterns comprises at least a pattern of at least one shock wave detected at each of at least two intrusion detectors.

3. A system for automatically controlling intrusion thresholds of intrusion detectors deployed in a premises according to claim 1 and wherein said premises is an automobile.

4. A system for automatically controlling intrusion thresholds of intrusion detectors deployed in a premises according to claim 1 and wherein said premises is a residence.

5. A system for automatically controlling intrusion thresholds of intrusion detectors deployed in a premises according to claim 1 and wherein said intrusion detectors comprise at least one motion detector.

6. A system for automatically controlling intrusion thresholds of intrusion detectors deployed in a premises according to claim 1 and wherein said intrusion detectors comprise at least one shock detector.

7. A system for automatically controlling intrusion thresholds of intrusion detectors deployed in a premises according to claim 1 and wherein said intrusion detectors comprise at least one environmental conditions detector.

8. A system for automatically controlling intrusion thresholds of intrusion detectors deployed in a premises according to claim 1 and wherein said intrusion detectors communicate with an intrusion alarm system.

9. A system for automatically controlling intrusion thresholds of intrusion detectors deployed in a premises according to claim 8 and wherein said system for automatically controlling intrusion thresholds of intrusion detectors deployed in a premises forms part of said intrusion alarm system.

10. A system for automatically controlling intrusion thresholds of intrusion detectors deployed in a premises according to claim 1 and wherein said automatically tuning said threshold of said at least a second intrusion detector deployed in said premises comprises lowering said threshold.

11. A system for automatically controlling intrusion thresholds of intrusion detectors deployed in a premises according to claim 1 and wherein said automatically tuning said threshold of said at least a second intrusion detector deployed in said premises comprises raising said threshold.

12. A system for automatically remotely controlling intrusion thresholds of intrusion detectors deployed in a plurality of premises, said system comprising:
   central intrusion detector output receiving functionality operative to receive at least one output from at least one intrusion detector deployed in a first of said plurality of premises;
   central intrusion detector output comparison functionality operative to compare said at least one output from said at least one intrusion detector deployed in said first of said plurality of premises with a multiplicity of premises intrusion detection patterns; and
   central intrusion detector threshold remote controlling functionality operative, in response to ascertaining that said at least one output from said at least one intrusion detector deployed in said first of said plurality of premises matches at least one of said multiplicity of premises intrusion detection patterns, to automatically remotely tune a threshold of at least one intrusion detector deployed in at least a second of said plurality of premises.

13. A system for automatically remotely controlling intrusion thresholds of intrusion detectors deployed in a plurality of premises according to claim 12 and wherein said central intrusion detector output receiving functionality is operative to receive said at least one output from said at least one intrusion detector deployed in said first of said plurality of premises via a premises intrusion detector threshold controlling subsystem deployed at said first of said plurality of premises.

14. A system for automatically remotely controlling intrusion thresholds of intrusion detectors deployed in a plurality of premises according to claim 12 and wherein said central intrusion detector threshold remote controlling functionality operative to automatically remotely tune said threshold of said at least one intrusion detector deployed in said at least a second of said plurality of premises via a premises intrusion detector threshold controlling subsystem deployed at said second of said plurality of premises.

15. A system for automatically remotely controlling intrusion thresholds of intrusion detectors deployed in a plurality of premises according to claim 12 and wherein said multiplicity of premises intrusion detection patterns comprises at least a pattern of at least one shock wave detected at each of at least two premises.

16. A system for automatically remotely controlling intrusion thresholds of intrusion detectors deployed in a plurality of premises according to claim 12 and wherein said plurality of premises comprises at least one automobile.

17. A system for automatically remotely controlling intrusion thresholds of intrusion detectors deployed in a plurality of premises according to claim 12 and wherein said plurality of premises comprises at least one residence.

18. A system for automatically remotely controlling intrusion thresholds of intrusion detectors deployed in a plurality of premises according to claim 12 and wherein said intrusion detectors comprise at least one motion detector.

19. A system for automatically remotely controlling intrusion thresholds of intrusion detectors deployed in a plurality of premises according to claim 12 and wherein said intrusion detectors comprise at least one shock detector.

20. A system for automatically remotely controlling intrusion thresholds of intrusion detectors deployed in a plurality of premises according to claim 12 and wherein said intrusion detectors comprise at least one environmental conditions detector.

21. A system for automatically remotely controlling intrusion thresholds of intrusion detectors deployed in a plurality of premises according to claim 12 and wherein said automatically remotely tuning said threshold of said at least one intrusion detector deployed in said at least a second of said plurality of premises comprises lowering said threshold.

22. A system for automatically remotely controlling intrusion thresholds of intrusion detectors deployed in a plurality of premises according to claim 12 and wherein said automatically remotely tuning said threshold of said at least one intrusion detector deployed in said at least a second of said plurality of premises comprises raising said threshold.

23. A system for automatically remotely controlling intrusion thresholds of intrusion detectors deployed in a plurality of premises, said system comprising:
    environmental information receiving functionality operative to receive environmental information pertaining to the environment of at least some of said plurality of premises;
    environmental information comparison functionality operative to compare said environmental information received from said environmental information receiving functionality with a multiplicity of environmental patterns; and
    central intrusion detector threshold remote controlling functionality operative, in response to ascertaining, by said environmental information comparison functionality, that said environmental information received from said environmental information receiving functionality matches at least one of said multiplicity of environmental patterns, to automatically remotely tune a threshold of at least one intrusion detector deployed in at least one of said some of said plurality of premises.

24. A system for automatically remotely controlling intrusion thresholds of intrusion detectors deployed in a plurality of premises according to claim 23 and wherein said central intrusion detector output receiving functionality is operative to receive said at least one output from said at least one intrusion detector deployed in said first of said plurality of premises via a premises intrusion detector threshold controlling subsystem deployed at said first of said plurality of premises.

25. A system for automatically remotely controlling intrusion thresholds of intrusion detectors deployed in a plurality of premises according to claim 23 and wherein said central intrusion detector threshold remote controlling functionality operative to automatically remotely tune said threshold of said at least one intrusion detector deployed in said at least a second of said plurality of premises via a premises intrusion detector threshold controlling subsystem deployed at said second of said plurality of premises.

26. A system for automatically remotely controlling intrusion thresholds of intrusion detectors deployed in a plurality of premises according to claim 23 and wherein said environmental information and said environmental patterns pertain to weather conditions at said at least some of said plurality of premises.

27. A system for automatically remotely controlling intrusion thresholds of intrusion detectors deployed in a plurality of premises according to claim 23 and wherein said environmental information pertains to recent intrusions detected at said at least some of said plurality of premises.

28. A system for automatically remotely controlling intrusion thresholds of intrusion detectors deployed in a plurality of premises according to claim 23 and wherein said plurality of premises comprises at least one automobile.

29. A system for automatically remotely controlling intrusion thresholds of intrusion detectors deployed in a plurality of premises according to claim 23 and wherein said plurality of premises comprises at least one residence.

30. A system for automatically remotely controlling intrusion thresholds of intrusion detectors deployed in a plurality of premises according to claim 23 and wherein said intrusion detectors comprise at least one motion detector.

31. A system for automatically remotely controlling intrusion thresholds of intrusion detectors deployed in a plurality of premises according to claim 23 and wherein said intrusion detectors comprise at least one shock detector.

32. A system for automatically remotely controlling intrusion thresholds of intrusion detectors deployed in a plurality of premises according to claim 23 and wherein said intrusion detectors comprise at least one environmental conditions detector.

33. A system for automatically remotely controlling intrusion thresholds of intrusion detectors deployed in a plurality of premises according to claim 23 and wherein said automatically remotely tuning said threshold of said at least one intrusion detector deployed in said at least a second of said plurality of premises comprises lowering said threshold.

34. A system for automatically remotely controlling intrusion thresholds of intrusion detectors deployed in a plurality of premises according to claim 23 and wherein said automatically remotely tuning said threshold of said at least one intrusion detector deployed in said at least a second of said plurality of premises comprises raising said threshold.

35. A method for automatically controlling intrusion thresholds of intrusion detectors deployed in a premises, said method comprising:
receiving at least one output from at least a first intrusion detector deployed in said premises;
comparing said at least one output from said at least a first intrusion detector with at least one of a multiplicity of premises intrusion detection patterns; and
in response to ascertaining that said at least one output from said at least a first intrusion detector matches at least one of said multiplicity of premises intrusion detection patterns, tuning a threshold of at least a second intrusion detector deployed in said premises.

36. A method for automatically controlling intrusion thresholds of intrusion detectors deployed in a premises according to claim 35 and wherein said at least one of said multiplicity of premises intrusion detection patterns comprises at least a pattern of at least one shock wave detected at each of at least two intrusion detectors.

37. A method for automatically controlling intrusion thresholds of intrusion detectors deployed in a premises according to claim 35 and wherein said premises is an automobile.

38. A method for automatically controlling intrusion thresholds of intrusion detectors deployed in a premises according to claim 35 and wherein said premises is a residence.

39. A method for automatically controlling intrusion thresholds of intrusion detectors deployed in a premises according to claim 35 and wherein said intrusion detectors comprise at least one motion detector.

40. A method for automatically controlling intrusion thresholds of intrusion detectors deployed in a premises according to claim 35 and wherein said intrusion detectors comprise at least one shock detector.

41. A method for automatically controlling intrusion thresholds of intrusion detectors deployed in a premises according to claim 35 and wherein said intrusion detectors comprise at least one environmental conditions detector.

42. A method for automatically controlling intrusion thresholds of intrusion detectors deployed in a premises according to claim 35 and wherein said intrusion detectors communicate with an intrusion alarm system.

43. A method for automatically controlling intrusion thresholds of intrusion detectors deployed in a premises according to claim 35 and wherein said automatically tuning said threshold of said at least a second intrusion detector deployed in said premises comprises lowering said threshold.

44. A method for automatically controlling intrusion thresholds of intrusion detectors deployed in a premises according to claim 35 and wherein said automatically tuning said threshold of said at least a second intrusion detector deployed in said premises comprises raising said threshold.

45. A method for automatically remotely controlling intrusion thresholds of intrusion detectors deployed in a plurality of premises, said method comprising:
receiving at least one output from at least one intrusion detector deployed in a first of said plurality of premises;
comparing said at least one output from said at least one intrusion detector deployed in said first of said plurality of premises with a multiplicity of premises intrusion detection patterns; and
in response to ascertaining that said at least one output from said at least one intrusion detector deployed in said first of said plurality of premises matches at least one of said multiplicity of premises intrusion detection patterns, automatically remotely tuning a threshold of at least one intrusion detector deployed in at least a second of said plurality of premises.

46. A method for automatically remotely controlling intrusion thresholds of intrusion detectors deployed in a plurality of premises according to claim 45 and wherein said multiplicity of premises intrusion detection patterns comprises at least a pattern of at least one shock wave detected at each of at least two premises.

47. A method for automatically remotely controlling intrusion thresholds of intrusion detectors deployed in a plurality of premises according to claim 45 and wherein said plurality of premises comprises at least one automobile.

48. A method for automatically remotely controlling intrusion thresholds of intrusion detectors deployed in a plurality of premises according to claim 45 and wherein said plurality of premises comprises at least one residence.

49. A method for automatically remotely controlling intrusion thresholds of intrusion detectors deployed in a plurality of premises according to claim 45 and wherein said intrusion detectors comprise at least one motion detector.

50. A method for automatically remotely controlling intrusion thresholds of intrusion detectors deployed in a plurality of premises according to claim 45 and wherein said intrusion detectors comprise at least one shock detector.

51. A method for automatically remotely controlling intrusion thresholds of intrusion detectors deployed in a plurality of premises according to claim 45 and wherein said intrusion detectors comprise at least one environmental conditions detector.

52. A method for automatically remotely controlling intrusion thresholds of intrusion detectors deployed in a plurality of premises according to claim 45 and wherein said automatically remotely tuning said threshold of said at least one intrusion detector deployed in said at least a second of said plurality of premises comprises lowering said threshold.

53. A method for automatically remotely controlling intrusion thresholds of intrusion detectors deployed in a plurality of premises according to claim 45 and wherein said automatically remotely tuning said threshold of said at least one intrusion detector deployed in said at least a second of said plurality of premises comprises raising said threshold.

54. A method for automatically remotely controlling intrusion thresholds of intrusion detectors deployed in a plurality of premises, said method comprising:
receiving environmental information pertaining to the environment of at least some of said plurality of premises;
comparing said environmental information received from said environmental information receiving functionality with a multiplicity of environmental patterns; and
in response to ascertaining that said environmental information received from said environmental information receiving functionality matches at least one of said multiplicity of environmental patterns, automatically remotely tuning a threshold of at least one intrusion detector deployed in at least one of said some of said plurality of premises.

55. A method for automatically remotely controlling intrusion thresholds of intrusion detectors deployed in a plurality of premises according to claim 54 and wherein said environmental information and said environmental patterns pertain to weather conditions at said at least some of said plurality of premises.

56. A method for automatically remotely controlling intrusion thresholds of intrusion detectors deployed in a plurality of premises according to claim 54 and wherein said environmental information pertains to recent intrusions detected at said at least some of said plurality of premises.

57. A method for automatically remotely controlling intrusion thresholds of intrusion detectors deployed in a plurality of premises according to claim 54 and wherein said plurality of premises comprises at least one automobile.

58. A method for automatically remotely controlling intrusion thresholds of intrusion detectors deployed in a plurality of premises according to claim 54 and wherein said plurality of premises comprises at least one residence.

59. A method for automatically remotely controlling intrusion thresholds of intrusion detectors deployed in a plurality of premises according to claim 54 and wherein said intrusion detectors comprise at least one motion detector.

60. A method for automatically remotely controlling intrusion thresholds of intrusion detectors deployed in a plurality of premises according to claim 54 and wherein said intrusion detectors comprise at least one shock detector.

61. A method for automatically remotely controlling intrusion thresholds of intrusion detectors deployed in a plurality of premises according to claim 54 and wherein said intrusion detectors comprise at least one environmental conditions detector.

62. A method for automatically remotely controlling intrusion thresholds of intrusion detectors deployed in a plurality of premises according to claim 54 and wherein said automatically remotely tuning said threshold of said at least one intrusion detector deployed in said at least a second of said plurality of premises comprises lowering said threshold.

63. A method for automatically remotely controlling intrusion thresholds of intrusion detectors deployed in a plurality of premises according to claim 54 and wherein said automatically remotely tuning said threshold of said at least one intrusion detector deployed in said at least a second of said plurality of premises comprises raising said threshold.

* * * * *